US010005217B2

(12) United States Patent
Willams et al.

(10) Patent No.: US 10,005,217 B2
(45) Date of Patent: Jun. 26, 2018

(54) FERRITE COMPOSITE SLEEVE SYSTEMS AND METHODS FOR COAXIAL APPLICATIONS

(71) Applicant: The Boeing Company, Chicago, IL (US)

(72) Inventors: John D. Willams, Decatur, AL (US); Andrew George Laquer, Tustin, CA (US)

(73) Assignee: The Boeing Company, Chicago, IL (US)

( * ) Notice: Subject to any disclaimer, the term of this patent is extended or adjusted under 35 U.S.C. 154(b) by 97 days.

(21) Appl. No.: 14/831,815

(22) Filed: Aug. 20, 2015

(65) Prior Publication Data

US 2017/0050363 A1 Feb. 23, 2017

(51) Int. Cl.
*B29C 47/00* (2006.01)
*B29C 47/06* (2006.01)
(Continued)

(52) U.S. Cl.
CPC .......... *B29C 47/0004* (2013.01); *B22F 3/008* (2013.01); *B22F 3/1055* (2013.01); *B22F 3/20* (2013.01); *B22F 5/00* (2013.01); *B29C 47/065* (2013.01); *B29C 64/10* (2017.08); *B29C 64/106* (2017.08); *B29C 64/153* (2017.08);
(Continued)

(58) Field of Classification Search
CPC ......... G02B 6/44; G02B 6/4411; H01P 11/00; H01P 11/005; H01P 1/183; H01P 1/19; H01P 1/32; H01P 3/06; B22F 3/008; B22F 3/1055; B22F 3/20; B22F 5/00; B29C 47/0004; B29C 47/065; B29C 64/10; B29C 64/106; B29C 64/153; B29C 64/165; B29C 67/0055; B29C 67/0081; B29K 2505/08; B29K 2995/0008; B29L 2031/34; B29L 2031/3462; B33Y 10/00; B33Y 70/00; B33Y 80/00; C22C 33/02; H01F 41/00
See application file for complete search history.

(56) References Cited

U.S. PATENT DOCUMENTS 5,270,106 A * 12/1993 Orlowski ............... G03G 15/75
174/126.2
5,305,410 A * 4/1994 Arroyo .................. G02B 6/447
385/109

(Continued)

OTHER PUBLICATIONS

Bergquist, Nathan, "RF Engineering and Modeling of Rectangular Micro-Coax Phase Shifter," A Thesis, 2011, pp. 1-195, University of Alabama, Huntsville/USA.
Chao et al., "Characterization of Micro-Structured Ferrite materials: Coarse and Fine Barium, and Photoresist Composites," IEEE Transactions on Magnetics, Jul. 2013, pp. 4319-4322, vol. 49, No. 7, IEEE, Piscataway/USA.
Sholiyi et al., "Electromagnetic properties of photodefinable barium ferrite polymer composites," AIP Advances, 2014, pp. 1-7, vol. 4, No. 077136, AIP Publishing, Melville/USA.

(Continued)

*Primary Examiner* — Carl Arbes
(74) *Attorney, Agent, or Firm* — Haynes and Boone, LLP

(57) ABSTRACT

According to an embodiment, a method includes receiving a magnetic device design comprising a magnetic structure to be formed, at least in part, from a magnetic material matrix, wherein the magnetic material matrix is configured to be used in at least one of a magnetic materials additive manufacturing system (MMAMS) and a magnetic materials bulk extrusion system (MMBES); receiving the magnetic material matrix by at least one of the MMAMS and the MMBES; and dispensing the magnetic material matrix using at least one of the MMAMS and the MMBES to form the magnetic structure.

20 Claims, 16 Drawing Sheets

(51) Int. Cl.
| | |
|---|---|
| *B33Y 10/00* | (2015.01) |
| *B29C 64/10* | (2017.01) |
| *B29C 64/153* | (2017.01) |
| *B22F 3/20* | (2006.01) |
| *B22F 5/00* | (2006.01) |
| *B22F 3/00* | (2006.01) |
| *B22F 3/105* | (2006.01) |
| *C22C 33/02* | (2006.01) |
| *H01F 41/00* | (2006.01) |
| *B29C 64/106* | (2017.01) |
| *B29C 64/165* | (2017.01) |
| *H01P 1/18* | (2006.01) |
| *H01P 1/19* | (2006.01) |
| *H01P 1/32* | (2006.01) |
| *H01P 3/06* | (2006.01) |
| *H01P 11/00* | (2006.01) |
| *B29C 67/00* | (2017.01) |
| *B33Y 70/00* | (2015.01) |
| *B33Y 80/00* | (2015.01) |
| *B29K 505/08* | (2006.01) |
| *B29L 31/34* | (2006.01) |

(52) U.S. Cl.
CPC ........ *B29C 64/165* (2017.08); *B29C 67/0055* (2013.01); *B29C 67/0081* (2013.01); *B33Y 10/00* (2014.12); *C22C 33/02* (2013.01); *H01F 41/00* (2013.01); *H01P 1/183* (2013.01); *H01P 1/19* (2013.01); *H01P 1/32* (2013.01); *H01P 3/06* (2013.01); *H01P 11/005* (2013.01); *B29K 2505/08* (2013.01); *B29K 2995/0008* (2013.01); *B29L 2031/34* (2013.01); *B29L 2031/3462* (2013.01); *B33Y 70/00* (2014.12); *B33Y 80/00* (2014.12); *Y02P 10/295* (2015.11)

(56) References Cited

U.S. PATENT DOCUMENTS

| | | | | |
|---|---|---|---|---|
| 5,305,411 | A * | 4/1994 | Arroyo | G02B 6/447 385/109 |
| 5,354,607 | A * | 10/1994 | Swift | G03G 15/75 310/248 |
| 5,370,106 | A * | 12/1994 | Beck | F24H 3/105 126/110 R |
| 5,577,147 | A * | 11/1996 | Arroyo | G02B 6/447 385/100 |
| 5,612,414 | A * | 3/1997 | Becker | C08G 18/10 525/102 |
| 6,670,880 | B1 * | 12/2003 | Hall | E21B 17/028 336/132 |
| 6,717,501 | B2 * | 4/2004 | Hall | E21B 17/028 336/117 |
| 7,258,896 | B2 * | 8/2007 | Deckard | B29C 67/0081 156/272.8 |
| 2014/0285025 | A1 * | 9/2014 | Alkan | G05F 7/00 307/101 |

OTHER PUBLICATIONS

Sholiyi, Olusegun Samuel, "Electromagnetic Characterization of Photo-Definable Ferrite Loaded Polymers and Their Applications in Micro-Rectangular Coaxial Phase Shifters," A Dissertation, Oct. 2014, pp. 1-142, University of Alabama, Huntsville/USA.

Sholiyi et al., "Electromagnetic characterization of strontium ferrite powders in series 2000, SU8 polymer," Materials Research Express, Oct. 22, 2014, pp. 1-16, vol. 1, No. 046107, IOP Publishing Ltd., Philadelphia/USA.

Sholiyi et al., "Microrectangular-Coaxial Phase Shifter for Microwave Devices," International Journal of RF and Microwave Computer-Aided Engineering, 2015, pp. 1-8, Wiley Periodicals, Inc., Hoboken/USA.

\* cited by examiner

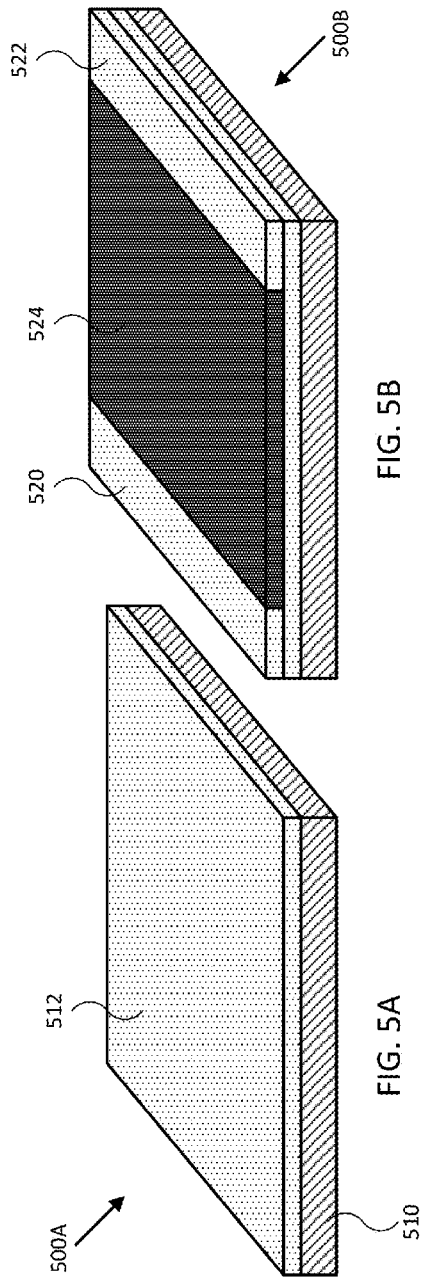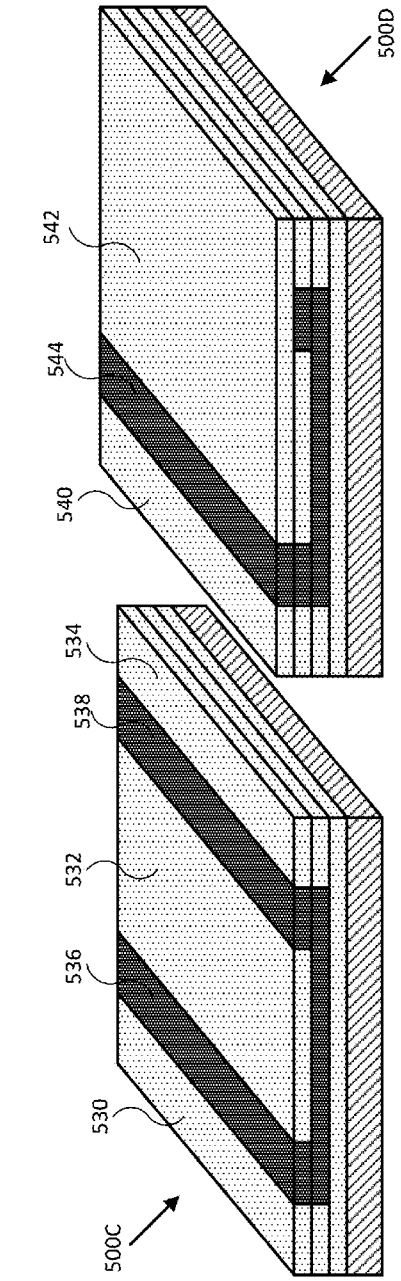
FIG. 5A  FIG. 5B  FIG. 5C  FIG. 5D

FERRITE COMPOSITE SLEEVE SYSTEMS AND METHODS FOR COAXIAL APPLICATIONS

CROSS REFERENCE TO RELATED APPLICATIONS

This patent application is related to U.S. patent application Ser. No. 14/831,737, filed Aug. 20, 2015 and entitled "Additive Manufacturing Systems and Methods for Magnetic Materials," which is hereby incorporated by reference in its entirety.

TECHNICAL FIELD

The present invention relates generally to magnetic material manufacturing and, more particularly, to systems and methods for manufacture of magnetic devices for coaxial transmission line devices.

BACKGROUND

Magnetic materials are used to form a wide array of electrical devices, such as motors, transformers, sensors, and/or other electronic devices. Contemporary devices are often miniaturized in order to form more compact systems, or, in the context of mobile applications, to reduce weight, reduce power, and/or otherwise add more functionality within a smaller footprint. Existing methods for forming relatively small magnetic devices typically include lithographic patterning or embossing using photoresist composites, mechanical polishing/placement, or electroplating.

Conventional electroforming can be used to plate metallic magnetic materials into lithographically patterned surfaces, and while the resolution of electroforming can be as low as 10's of nanometers, the technique cannot be used with substantially non-conductive ceramic permanent magnets or ferrite materials. Conventional lithography and embossing processes are also conventionally available, but these processes are limited in minimum resolution and require relatively complex multi-layer growth processes. In particular, these conventional methods are often unable to produce the types of complex three dimensional magnetic structures necessary for compact magnetic device designs, including designs associated with coaxial transmission lines and integrated devices, such as true delay lines and reciprocal and non-reciprocal phase shifters. Thus, there is a need for an improved methodology to provide compact magnetic devices that is relatively inexpensive, takes less time, and is less complex to implement.

SUMMARY

Techniques are disclosed for systems and methods to provide a magnetic materials additive manufacturing system (MMAMS) and a magnetic materials bulk extrusion system (MMBES) each configured to form compact magnetic structures and/or devices. In one embodiment, a method includes receiving a magnetic device design comprising a magnetic structure to be formed, at least in part, from a magnetic material matrix, wherein the magnetic material matrix is configured to be used in at least one of a magnetic materials additive manufacturing system (MMAMS) and a magnetic materials bulk extrusion system (MMBES); receiving the magnetic material matrix by at least one of the MMAMS and the MMBES; and dispensing the magnetic material matrix using at least one of the MMAMS and the MMBES to form the magnetic structure.

In another embodiment, a system includes a transmission line coupled between a signal source and a signal sink, wherein the transmission line includes an inner conductor separated from an outer conductor by at least a dielectric sleeve; the dielectric sleeve includes a ferrite matrix dispensed by at least one of an MMAMS and an MMBES; and the ferrite matrix is configured to modify an electromagnetic propagation characteristic of an electromagnetic wave while it propagates between the signal source and the signal sink.

In a further embodiment, a method includes receiving a signal of a signal source by a transmission line; propagating the signal between the signal source and a signal sink; and providing the signal to the signal sink by the transmission line, wherein the transmission line includes an inner conductor separated from an outer conductor by at least a dielectric sleeve; the dielectric sleeve includes a ferrite matrix dispensed by at least one of an MMAMS and an MMBES; and the ferrite matrix is configured to modify an electromagnetic propagation characteristic of the signal while it propagates between the signal source and the signal sink.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 5A-G illustrate various fabrication stages of a magnetic device and/or structure in accordance with an embodiment of the disclosure.

Embodiments of the present disclosure and their advantages are best understood by referring to the detailed description that follows. It should be appreciated that like reference numerals are used to identify like devices illustrated in one or more of the figures.

DETAILED DESCRIPTION

Figure 1:
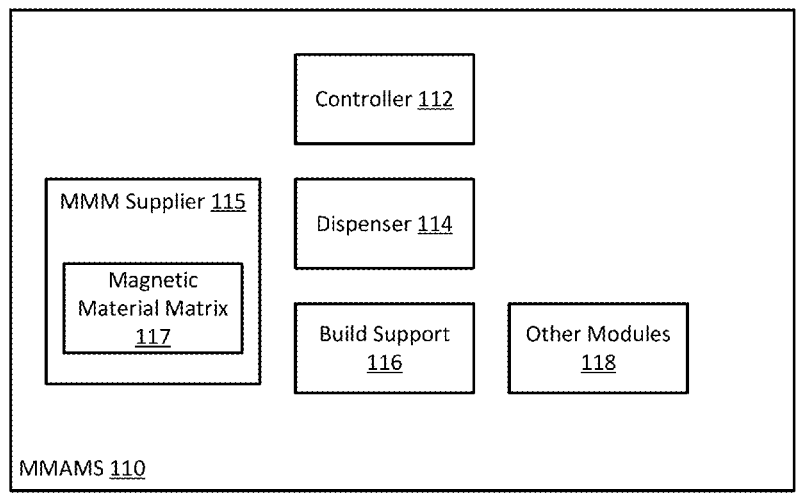
FIG. 1 illustrates a block diagram of a magnetic materials additive manufacturing system in accordance with an embodiment of the disclosure.

In accordance with one or more embodiments of the present disclosure, a method for forming compact magnetic structures and/or devices includes using an additive manufacturing process to dispense magnetic material matrix in a high resolution pattern in order to form the compact magnetic structures and/or devices. In various embodiments, a magnetic materials additive manufacturing system (MMAMS) may include a controller and one or more dispensers (e.g., extruder nozzles, liquid dispensers, wire dispensers, and/or other magnetic material dispensers) configured to dispense magnetic material matrix in a high resolution pattern to form a patterned magnetic structure and/or device on a build support. The MMAMS may be integrated with other AMSs and/or other fabrication systems and/or subsystems to form complex and compact electronic devices incorporating magnetic structures and/or devices, relatively quickly and inexpensively, as compared to conventional methods.

In other embodiments of the present disclosure, a method for forming compact magnetic structures and/or devices includes using a bulk extrusion process to dispense magnetic material matrix in a high resolution wire shape (e.g., effectively a two dimensional shape with variable length) which may be used to form the compact magnetic structures and/or devices. In various embodiments, a magnetic materials bulk extrusion system (MMBES) may include a controller and one or more pattern extrusion tools configured to dispense magnetic material matrix as an extruded wire shaped magnetic structure, which may then be cut to length and used to form a composite magnetic device. The MMBES may be integrated with other fabrication systems and/or subsystems to form complex and compact electronic devices incorporating magnetic structures and/or devices, relatively quickly and inexpensively, as compared to conventional methods.

In embodiments where the manufacturing system includes an MMAMS, the described technique directly writes magnetic materials into complex three dimensional shapes with design resolutions of approximately 10 um. The magnetic material may be placed (using electronic control) into desired one, two, or three dimensional patterns in minutes. In various embodiments, three dimensional shapes can be patterned by dispensing a highly viscous polymer and curing in place using heat, light, and/or other catalyst as it is printed, additive forming of pre-solidified magnetic composite filament (e.g., NdFeB mixed with a polymer) in free space, additively forming a nonmagnetic material alongside the magnetic material for mechanical support, and/or using other additive manufacturing techniques. The nonmagnetic material can be retained or dissolved away after the magnetic material is cured or dried.

In embodiments where the manufacturing system includes an MMBES, the described technique extrudes magnetic materials into complex wire shapes (e.g., complex two dimensional shapes with variable length) with similar design resolutions to those possible with an MMAMS, but at a much higher production rate (e.g., comparable to the increase in production rate of plastic extrusion over conventional machining techniques). In various embodiments, wire shapes can be formed by forcing bulk magnetic material (e.g., NdFeB mixed with a polymer) through a pattern extrusion tool including a two dimensional pattern die that forces the bulk magnetic material into a particular wire shape that may be extruded at any desired length and then cut to fit a particular application. In some embodiments, the pattern extrusion tool may be configured to accept multiple types of bulk magnetic materials and/or nonmagnetic materials, at the same time, and form a complex wire shape including multiple different types of magnetic materials and/or nonmagnetic materials effectively welded together by the extrusion process/tool to form the complex wire shape.

The result of either manufacturing system is a highly precise magnetic field pattern placed inside a polymer structure. Various portions of polymer within the overall device may include the magnetic material or may not include the magnetic material. Typically, the magnetic material will be only a small fraction of the total volume of the overall device, but the field generated by the incorporated magnetic material can be focused precisely onto the volumetric space required to drive an electromechanical, radio frequency, terahertz, or optical device. In some embodiments, limited heating may be applied when forming the magnetic structures, allowing the material to be isotropically magnetized prior to patterning or bulk extrusion. This means that one can create very complex magnetic shapes that may not otherwise be possible using lithographic patterning or embossing. Finished components can be magnetized using a conventional large area magnetizing tool or magnetic field generator, as described herein.

More specifically, either or both MMAMSs and MMBESs may be used to form a magnetic dielectric sleeve disposed between an inner conductor (e.g., a center conductor) and an outer conductor for coaxial transmission lines. For example, the magnetic dielectric sleeve may be formed from a ferrite (an electrically nonconductive ferrimagnetic material) impregnated polymer, and the sleeve may be used to form rectangular or cylindrical (e.g., including non-rectangular polygonal) coaxial transmission lines that can be configured as dynamically tunable or adjustable true delay lines, phase shifters, and/or other reciprocal or nonreciprocal electrical or electronic devices. In one embodiment, a coaxial transmission line may be assembled by inserting the magnetic dielectric sleeve into an existing outer conductor and then inserting an inner conductor into a center channel formed within the dielectric sleeve, such as through a threading or pressing process. The amount of the effect of the dielectric sleeve on a transmitted signal may be adjusted by application of a magnetic field, for example, which can be generated by an external coil, various ferromagnetic materials disposed near or within the coaxial transmission line (e.g., within the inner and/or outer conductors), and/or using other techniques for applying a magnetic field to the magnetic dielectric sleeve. Embodiments of the present disclosure provide a relatively low-loss dielectric for coaxial transmission lines operating from less than 0.1 GHz out to at least 60 GHz.

FIG. 1 illustrates a block diagram 100 of a magnetic materials additive manufacturing system (MMAMS) 110 in accordance with an embodiment of the disclosure. As shown in FIG. 1, MMAMS 110 includes a controller 112, a dispenser 114 configured to receive magnetic material matrix 117 from a supplier 115, and a build support 116. In various embodiments, controller 112 may be configured to control the various elements of system 110 to form one or more magnetic structures from magnetic material matrix 117 using an additive manufacturing process corresponding to MMAMS 110. For example, in embodiments where MMAMS 110 is implemented as a fused filament fabrication additive manufacturing system (FFFAMS), controller 112 may be configured to receive a design for a magnetic device (e.g., in the form of an electronic data file provided by an external logic device, such as a computer and/or memory device) and to dispense magnetic material matrix 117 (e.g., in the form of magnetic particle impregnated acrylonitrile butadiene styrene (ABS), polycarbonate (PC), polylactic acid (PLA), high density polyethylene (HDPE), PC/ABS, polyphenylsulfone (PPSU), high impact polystyrene (HIPS), and/or other polymer filament provided by supplier 115) to form a magnetic structure of the magnetic device from magnetic material matrix 117 using dispenser 114.

More generally, MMAMS may be implemented as an FFF AMS, a stereolithographic AMS (e.g., which may be configured to form solid magnetic structures from magnetic particle impregnated liquids using photopolymerization and/or other types of liquid curing processes), a wire or particle fusing AMS (e.g., which may be configured to form magnetic structures from magnetic wires and/or granules fused to one another using a laser, electron-beam, and/or other types of melting, sintering, and/or fusing device), and/or other types of AMSs that can be configured to form magnetic structures from magnetic material matrix 117 (e.g., magnetic particle impregnated filaments and/or liquids, magnetic granules or particles, and/or other magnetic material matrixes). In some embodiments, different types of AMSs, such as FFF and stereolithographic AMSs, may be combined into a single MMAMS that can be configured to form magnetic structures utilizing multiple different types of additive manufacturing processes.

Controller 112 may be implemented with any appropriate logic device (e.g., processing device, microcontroller, processor, application specific integrated circuit (ASIC), field programmable gate array (FPGA), memory storage device, memory reader, or other device or combinations of devices) or distributed combination of logic devices that may be adapted to execute, store, receive, and/or provide appropriate instructions, such as software instructions implementing a method and/or control loop for forming a magnetic structure, for example, using one or more elements of MMAMS 110. In addition, controller 112 may be implemented with one or more machine readable mediums configured to store non-transitory instructions and/or data files, such as design data files, for loading into and/or execution by controller 112. Such machine readable mediums may be internal, external, and/or otherwise configured to interface with controller 112. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), various types of universal serial bus (USB), and/or other interfaces).

Dispenser 114 may be implemented as an actuated or substantially stationary filament extrusion nozzle, liquid dispenser nozzle, print head, wire and/or granule placement device, and/or any other type of dispenser configured to receive magnetic material matrix 117 from supplier 115 and dispense magnetic material matrix 117 in a pattern, layer, or bulk liquid configured to form at least a portion of a magnetic structure supported by build support 116. For example, in embodiments where MMAMS 110 is at least partially implemented as an FFF AMS, dispenser 114 may include an actuated (e.g., using one or more stepper motors, for example) filament extrusion nozzle configured to receive magnetic matrix filament from a reel or spool of supplier 115 and heat, soften, and/or melt the magnetic matrix filament (e.g., using a heater integrated with dispenser 114) as it dispenses the magnetic matrix filament in one or more patterned layers to form a magnetic structure on build support 116.

In embodiments where MMAMS 110 is at least partially implemented as a stereolithographic AMS, dispenser 114 may include an actuated liquid dispenser nozzle configured to receive magnetic matrix liquid from a reservoir of supplier 115 and dispense the magnetic matrix liquid in one or more patterned layers to form a magnetic structure, for example, or dispense the magnetic matrix liquid into a pre-formed (e.g., using a different dispenser and/or AMS, and/or other types of fabrication systems) mould. In one or more embodiments, a nozzle of dispenser 114 may be implemented with substantially nonmagnetic materials, for example, to help reduce a risk of accumulation of magnetic material and/or blockage within dispenser 114. In some embodiments, the liquid dispenser nozzle may be implemented with a heater to help adjust a viscosity/flow rate of magnetic material matrix 117, for example, and/or to help adjust a magnetization of magnetic material matrix 117 as it is dispensed. In other embodiments, dispenser 114 may be configured to dispense bulk magnetic matrix liquid into a build reservoir of build support 116, for example, and one or more lasers and/or other curing devices (e.g., other modules 118) may be used to cure patterned layers of the bulk magnetic matrix liquid on build support 116 to form a magnetic structure.

In various embodiments, magnetic matrix filament, magnetic matrix liquid, and/or other magnetic material matrixes 117 may be cured after being dispensed by dispenser 114 by allowing the matrix to cool, by applying a catalyst such as heat, a chemical, a type of electromagnetic radiation (e.g., light), and/or other type of catalyst, and/or by applying other types of curing processes. In embodiments where MMAMS 110 is at least partially implemented as a wire or particle fusing AMS, dispenser 114 may include an actuated wire or particle dispenser nozzle configured to receive magnetic wire or magnetic particles from supplier 115 and dispense the wire or particles in one or more patterned layers, which may then be melted, sintered, or otherwise fused to each other and/or prior-formed layers to form a magnetic structure. Such fusing may be performed using a laser, an electron beam, and/or other type of fusing device (e.g., other modules 118).

Build support 116 may be implemented as a mechanically actuated platform, such as for an FFF AMS, for example, or may be implemented as a mechanically actuated reservoir and/or platform, where the reservoir may be configured to contain bulk liquid magnetic matrix, and where the platform and/or reservoir may be configured to separate to lift a magnetic structure out from the reservoir as the magnetic structure is formed coupled to the platform. In some embodiments, build support 116 may be actuated so as to move relative to dispenser 114 to facilitate formation of a magnetic structure. In one embodiment, dispenser 114 may be substantially stationary throughout a manufacturing process, for example, and build support 116 may be configured to move and/or rotate relative to dispenser 114 to help form a magnetic structure. Build support 116 may also be implemented with one or more features configured to facilitate a type of additive manufacturing process, such as a platform temperature controller (e.g., a heater or cooler) or a device or vacuum chuck (e.g., configured to help keep a partially or completely formed magnetic structure or device stationary relative to build support 116 during formation).

In various embodiments, other modules 118 may include one or more devices configured to facilitate a type of additive manufacturing process performed by MMAMS 110. For example, other modules 118 may include a curing, melting, sintering, or fusing laser and/or electron beam device, a pattern projector, a temperature sensor (e.g., configured to monitor a temperature of dispenser 114, build support 116, an ambient temperature of MMAMS 110, and/or other process temperatures associated with operation of MMAMS 110), a magnetic field generator, a demagnetizer, a device or vacuum chuck (e.g., on which to mount or form a magnetic structure, a magnetic device, a mould, and/or other structure), a transport mechanism (e.g., configured to mechanically transport a magnetic structure, build support 116, and/or a device or vacuum chuck to and from MMAMS 110), an alignment sensor (e.g., configured to sense a position of dispenser 114, build support 116, and/or portions of a magnetic structure or device supported by build support 116), one or more actuators configured to position elements of MMAMS 110 (e.g., including elements of other modules 118), one or more heaters (e.g., to adjust a temperature of dispenser 114, build support 116, an ambient temperature of MMAMS 110, and/or other elements of MMAMS 110), and/or other devices.

In some embodiments, various devices of other modules 118 may be integrated with other elements of MMAMS 110 to help facilitate forming a magnetic structure and/or device. For example, a heater and/or temperature sensor of other modules 118 may be integrated with dispenser 114 and/or build support 116 and/or coupled to controller 112 to help control or maintain a particular temperature at dispenser 114 and/or build support 116. In other embodiments, a heater, a magnetic field generator (e.g., an adjustable current supply coupled to a Helmholtz coil or other electromagnet coil configuration, with or without an adjustable orientation relative to build support 116), a demagnetizer (e.g., a magnetic field generator with an adjustable alternating current supply), and/or other magnetism adjustment device may be integrated with dispenser 114 and/or build support 116 to help adjust a magnetic property of a magnetic structure formed by MMAMS 110. Such magnetic adjustment devices may be configured to make such adjustments in situ relative to the additive manufacturing process performed by MMAMS 110, for example, or ex situ, such that magnetic adjustment would take place at intermediate steps in or after completion of the formation of a magnetic structure.

In one embodiment, dispenser 114, build support 116, and/or other elements of MMAMS 110 may be implemented with a magnetic field generator configured to guide magnetic particles and/or powder (e.g., in bulk or within a liquid) to a particular position on build support 116, such as within a preformed mould. In general, MMAMS 110 may be implemented with multiple dispensers 114 and/or suppliers 115 to allow formation of magnetic structures and/or devices using multiple types of materials, including magnetic material matrixes 117 and/or nonmagnetic materials (e.g., used to form nonmagnetic structure, such as mechanical supports and/or moulds, for a magnetic device).

Various embodiments of MMAMS 110 may be used to form magnetic structures with reliable dimension resolutions of approximately 10 to 20 um. For example, where MMAMS 110 is at least partially implemented as an FFF AMS and/or a stereolithographic AMS, utilizing a magnetic particle impregnated polymer liquid and/or filament, MMAMS 110 may be configured to form one or more magnetic structures with dimension resolutions as small as approximately 10 or 20 um, for example, while maintaining approximately 50% of the magnetic properties/effects of bulk (e.g., machined and/or shaped) magnetic counterparts. Thus, embodiments of MMAMS 110 may be configured to form magnetic structures configured for mechanical, electrical, and/or radio frequency applications in extremely compact spaces, relative to conventional methods. Moreover, due in part to the resolution attainable by embodiments of MMAMS 110 and/or the spatial flexibility offered by additive manufacturing using magnetic material matrixes, as opposed to conventional machining, lapping, photolithography, or other conventional shaping of magnetic structures, magnetic structures formed using embodiments described herein may be configured to generate extremely complex and compact three dimensional magnetic fields and/or gradients.

Figure 2:
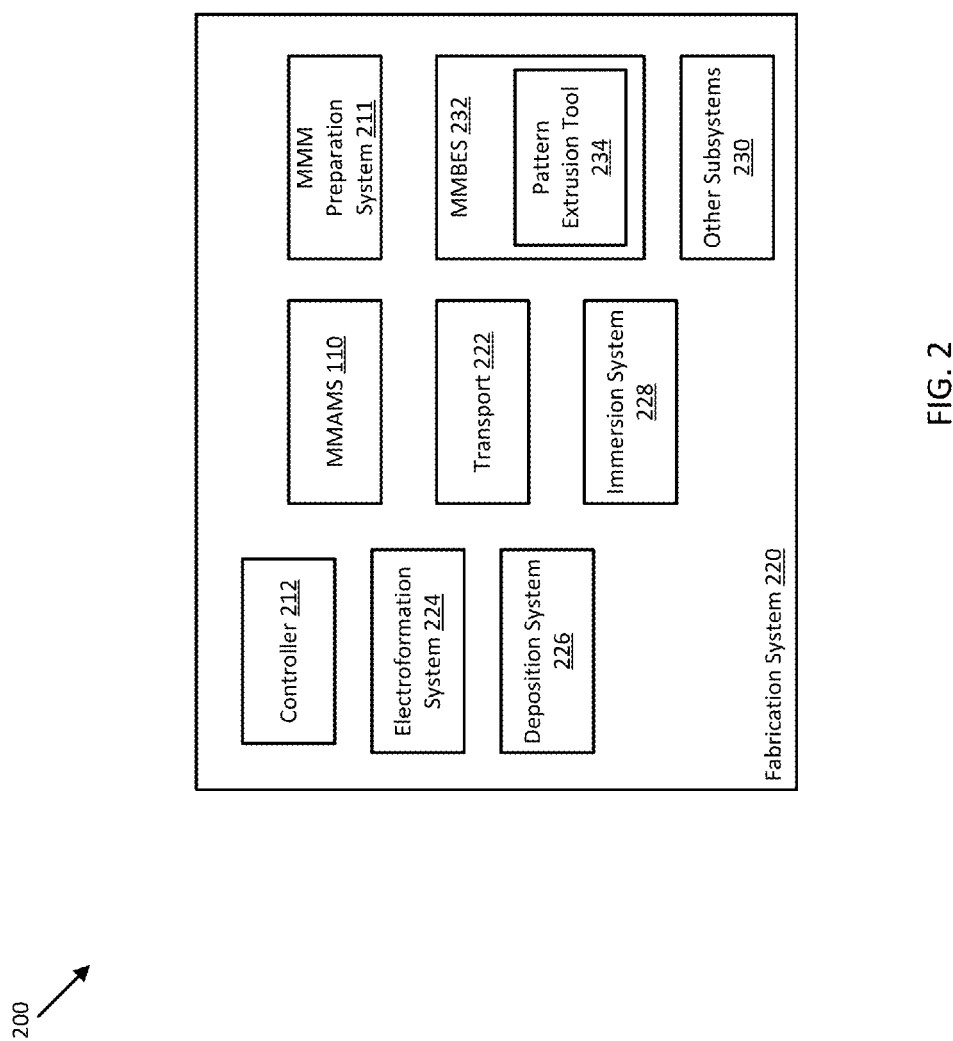
FIG. 2 illustrates a block diagram of a fabrication system including a magnetic materials additive manufacturing system and/or a magnetic materials bulk extrusion system in accordance with an embodiment of the disclosure.

FIG. 2 illustrates a block diagram 200 of a fabrication system 220 including MMAMS 110 and/or magnetic materials bulk extrusion system (MMBES) 232 in accordance with an embodiment of the disclosure. For example, fabrication system 220 may be configured to use multiple different types of fabrication processes to help form a monolithic device integrated with one or more magnetic structures and/or devices formed by MMAMS 110 and/or MMBES 232. As shown in FIG. 2, fabrication system 120 may include electroformation system 224, deposition system 226, immersion system 228, and one or more other subsystems 230, each able to help process a magnetic device and/or structure formed, at least in part, by MMAMS 110 and/or MMBES 232. In various embodiments, a magnetic device and/or other structure in various stages of manufacture may be conveyed between elements of fabrication system 220 by transport 222, which may be implemented as a device or vacuum chuck conveyance system, for example, and/or other transport configured to retrieve a magnetic device and/or other structure from any element of fabrication system 220 and deliver the device or structure to another element of fabrication system 220. In some embodiments, transport 222 may be implemented, at least in part, by a user conveying a device or structure between elements of fabrication system 220. Operation of transport 222 and/or other elements of fabrication system 220 may be controlled and/or otherwise facilitated by controller 212, which may be implemented as one or more monolithic or distributed logic devices similar to controller 112 of FIG. 1, for example, that may be configured to communicate with any element of fabrication system 120 to operate fabrication system 220.

In the embodiment shown in FIG. 2, fabrication system 220 includes preparation system 211, which may be configured to prepare magnetic material matrix for use with MMAMS 110 and/or MMBES 232 and/or to deliver magnetic material matrix to MMAMS 110 (e.g., to supplier 115 of MMAMS 110, as shown in FIG. 1) and/or MMBES 232. In some embodiments, preparation system 211 may be configured to mix a magnetic powder with a liquid polymer resin to provide a bulk liquid magnetic matrix. Preparation system 211 may be configured to provide that bulk liquid magnetic matrix directly to MMAMS 110 and/or MMBES 232, for example, or to solidify/cure the liquid magnetic matrix to form bulk solid magnetic matrix and then provide it to MMBES 232 or form/extrude it into filament, wire, and/or laminate, which can be provided to MMAMS 110 as a base magnetic material matrix from which to form a magnetic structure using a corresponding type of additive manufacturing process, as described herein. In other embodiments, preparation system 211 may be configured to extrude and/or spool a magnetic wire (e.g., from bulk magnetic material and/or wire), or to package magnetic granules, particles, and/or powder, for example, to provide magnetic material matrix to MMAMS 110 that is suitable for fusing.

Possible ingredients for a magnetic material matrix include, without limitation, various types and/or arrangements of ferromagnetic and/or ferrimagnetic materials, hard and/or soft magnetic materials, bulk ferrite or ferromagnetic materials, ferrite and/or ferromagnetic powders (e.g., with grain sizes between approximately 0.8 to 6 um, or more broadly between 0.02 and 10 um), nonconductive ceramic magnetic materials, Barium Hexaferrite (BaFe12O19), various other hexagonal ferrites, Neodymium (Nd2Fe14B) permanent magnets, soft nickel-iron alloy (NiFe), various other permanent magnet materials, SU8 photoresist, other photoresist polymers, ABS, Ultem, PVA, Nylon, Styrene, PMMA, PC, PLA, HDPE, ultra HDPE, PC/ABS, PPSU, HIPS, thermoplastic polymers, light sensitive stereolithography photo-resin, and/or other liquid and/or melt-able polymers. Some possible requirements for the base polymer may include low dielectric loss (e.g., $\delta < 0.02$), measured dielectric constant $\in < 3.5$ at 10 GHz, and a softening temperature above 95 degrees Celsius to ensure dimensional stability for electronic power handling. When mixing powders and polymers, mixing can commence at various mass ratios, such as 1:1, 3:1, and/or across the range of 0.5:1 to more than 5:1 (e.g., mass of powder:mass of polymer). Also, some magnetic material matrix may include a chemical additive to reduce differences in the interfacial surface energy of constituent materials. For example, in one embodiment, a relatively small amount (e.g., 5 mL of additive per L of polymer/resist) of ethyl acetate and 1-cyano-ethyl-2theyl-4 methylimidazole may be added to SU8 when mixing with Barium Hexaferrite powder to help ensure relatively homogenous mixing. In various embodiments, mixing may be performed by a nonmagnetic stirring device.

As is known in the art, ferromagnetic materials may be characterized as including aligned magnetic domains that produce relatively strong net magnetic fields, whereas ferrimagnetic materials may be characterized as including opposed magnetic domains, as with antiferromagnetic materials, but with an anisotropy in the moments of the opposing magnetic domains such that a net or aggregate magnetic moment remains. The net magnetic moment of the ferrimagnetic material (e.g., a ferrite matrix) can be selectively aligned relative to a propagating electromagnetic field (e.g., using an externally applied magnetic polling field, which may be provided by a ferromagnetic material for example) to modify various propagation characteristics of the propagating electromagnetic field, as described more fully herein.

Electroformation system 224 may be implemented as any electrodeposition, electroplating, and/or other type of electroforming system that can be configured to form a metal layer of a selectable thickness on a conductive surface, such as a patterned conductive surface. For example, electroformation system 224 may be configured to form a layer of an electroformation metal that is one micrometer thick or thicker over any exposed conductive surface of a partially formed magnetic structure and/or device, and/or to form a relatively thick substrate on which to form a magnetic structure and/or device. In various embodiments, the exposed conductive surface may be selective exposed by an electroformation mask, such as patterned photoresist. Deposition system 226 may be implemented as any sputter deposition system and/or other type of film deposition system that can be configured to form a patterned material layer of a selectable thickness on a substrate. For example, using a deposition mask, deposition system 226 may be configured to form a layer of a metal material that is less than one micrometer thick or thicker, such as a metal seed layer, over a portion of a partially formed magnetic structure and/or device that is exposed by the deposition mask. Such exposed portions may include conductive and/or nonconductive surfaces.

Immersion system 228 may be implemented as any etching, cleaning, filling, and/or other type of chemical immersion system that can be configured to partially or completely immerse and/or spray an object to chemically etch, clean, dissolve, fill, or otherwise process the object. For example, immersion system 228 may be configured to dissolve nonmagnetic polymer or resin and/or other nonmagnetic structure within a partially formed magnetic structure and/or device to remove unwanted portions (e.g., fabrication supports or moulds, for example) of the partially formed magnetic structure or device. In some embodiments, immersion system 228 may be configured to immerse a partially formed magnetic structure or device to fill one or more cavities within the magnetic structure or device with a particular type of material, such as a dielectric material, for example, or other magnetic or nonmagnetic material in solution form, which can then be cured to form a portion of the magnetic structure and/or device. In various embodiments, immersion system 228 may be used with an immersion mask to select portions of a magnetic structure and/or device to etch, clean, dissolve, or fill a magnetic structure and/or device. In some embodiments, immersion system 228 may be implemented with a heater, lamp, and/or other type of curing device to help dry or cure a magnetic structure and/or device.

MMBES 232 may be implemented as any bulk material extrusion system that can be configured to receive magnetic material matrix (e.g., from preparation system 211) and use a pattern extrusion tool 234 to form a patterned magnetic structure from the magnetic material matrix. For example, MMBES 232 may be configured to receive liquid, semisolid, or solid bulk magnetic material matrix from preparation system 211 and use pattern extrusion tool 234 to form complex magnetic wire shapes, such as a C-shaped magnetic dielectric sleeve, which may then be cut by a cutting tool (e.g., other subsystems 230) to appropriate lengths and assembled into a coaxial transmission line through use of transport 222 and/or other elements of fabrication system 220. In various embodiments, MMBES 232 may be implemented similarly to and/or with any of the elements described in reference to MMAMS 110, such as controller 112, supplier 115, build support 116, and/or other modules 118. In some embodiments, MMBES 232 may be configured to receive multiple types of materials substantially at the same time, such as one or more different types of magnetic material matrixes, and/or one or more different types of nonmagnetic polymer materials, and form complex magnetic wire shapes, such as C-shaped magnetic dielectric sleeves, from the multiple types of materials, which may be fused or welded together by the extrusion process or tool. In various embodiments, MMBES 232 may be implemented with a cutting tool, a heater, a temperature quenching device, a feed inlet, a caterpillar output feed line, a spooling device, and/or other devices configured to help form and/or transport a substantially wire shaped magnetic structure and/or device.

In various embodiments, other subsystems 230 may include one or more devices configured to facilitate a fabrication process performed by fabrication system 220 and/or elements of fabrication system 220. For example, other subsystems 230 may include various types of non-magnetic AMSs, material supply and/or preparation systems, a curing, melting, sintering, or fusing laser and/or electron beam device, a precision wire cutting device, a pattern projector, a temperature sensor (e.g., configured to monitor process temperatures associated with operation of fabrication system 220), a magnetic field generator, a demagnetizer, a device or vacuum chuck, an alignment sensor (e.g., configured to sense a position and/or orientation of a magnetic structure or device partially or fully fabricated by fabrication system 220), one or more actuators configured to position elements of fabrication system 220 (e.g., including elements of other subsystems 230), one or more heaters (e.g., to adjust a temperature of elements of fabrication system 220), a wire spooling device, a threading and/or pressing device (e.g., configured to thread or press an inner conductor for a coaxial transmission line into dielectric sleeve, and/or a dielectric sleeve into an outer conductor for a coaxial transmission line) and/or other devices. In some embodiments, other subsystems 230 may include a pic and place machine configured to place integrated circuits and/or other circuit elements on a substrate, such as a printed circuit board (PCB), to integrate such circuit elements with a magnetic structure and/or device provided, at least in part, by MMAMS 110 and/or MMBES 232, onto the substrate.

In some embodiments, various devices of other subsystems 230 may be integrated with other elements of fabrication system 220 to help facilitate forming a magnetic structure and/or device. For example, a heater and/or temperature sensor of other subsystems 230 may be integrated with electroformation system 224 and/or immersion system 228 and/or coupled to controller 212 to help control or maintain a particular temperature at electroformation system 224 and/or immersion system 228. In other embodiments, a heater, a magnetic field generator, a demagnetizer, and/or other magnetism adjustment device may be integrated with any element of fabrication system 220 to help adjust a magnetic or other property of a magnetic structure and/or device formed by fabrication system 220.

By integrating MMAMS 110 and/or MMBES 232 with fabrication system 220, embodiments of the present disclosure may be configured to provide electronic devices with integrated magnetic structures having reliable dimension resolutions of 10-20 um. Moreover, due in part to the relatively fine dimension resolution and/or the spatial flexibility offered by additive manufacturing or extrusion manufacturing using magnetic material matrixes, electronic devices including integrated magnetic structures formed using the processes and/or systems described herein may be configured to function under and/or benefit from extremely complex and compact two or three dimensional magnetic fields and/or gradients, as described herein.

One magnetic device that can take advantage of the manufacturing capabilities of MMAMS 110, MMBES 232, and/or fabrication system 220 is a coaxial transmission line for electromagnetic waves (e.g., electrical and/or optical propagating waves). To explain, ferrite materials can be useful to modify propagation characteristics of electromagnetic waves, and magnetic poling is typically required for microwave or higher frequency applications involving ferrite materials. Conventional poling methods typically rely on relatively large (size and field strength) external magnets and/or inductors to polarize machine polished (e.g., relatively large) ferrite blocks. The size of the external magnet in such structures can be a few millimeters across or more in each of the three principal dimensional axes. The strength of the poling field required for the ferrite material depends on the type of ferrite material, the application, and the geometry and proximity of the ferrite material, and the field strength supplied by the external magnet depends on its physical distance from the ferrite material and, in some embodiments, the number of magnetic poles focusing it onto the ferrite. In many applications, geometrical restrictions require external magnets to be placed hundreds of microns or more from the ferrite. Under such conditions, strong magnets must be used, which can interfere with other electronic components and lead to increased design complexity and lower overall product performance.

Embodiments of the present disclosure provide C-shaped ferrite dielectric sleeves (e.g., magnetic structures) that may be formed relatively quickly and inexpensively, that may be assembled into a coaxial transmission line relatively easily, and that allow for much smaller features sizes and tighter positional tolerances than with conventional methods. This helps reduce the need for large external magnets, which, when used with embodiments of the present disclosure, can be miniaturized and/or integrated with the coaxial transmission line so as to reduce interference with other electronic components and reduce design complexity while increasing overall product performance. Moreover, embodiments of the present disclosure may produce C-shaped ferrite dielectric sleeves that can be used with inner conductors having complex geometries, such as inner conductors formed in the shape of spring pin conductors, such as rectangular spring pin connectors, which can result in coaxial transmission lines that are easier to interconnect signal sources and signal sinks when assembling an electronic device.

In addition, embodiments of the present disclosure allow the poling magnet to be placed within a few microns of the ferrite. For example, the poling magnet may be incorporated directly into the transmission line/waveguide, and the magnetic field may be essentially focused directly through the ferrite dielectric sleeve. Such arrangements reduce the need for high field magnets because most ferrites only require a 0.2-0.5 Tesla applied field in order to become sufficiently polarized to have an effect on a local propagating electromagnetic wave. By providing the reduced field requirements and the general decrease in size of the magnet, embodiments of the present disclosure reduce the amount of magnetic field interactions present in electronic devices incorporating a conforming magnetic structure or device.

For example, a ferromagnetic material coated with a nonmagnetic conductor may be used as the inner and/or outer conductor of a coaxial transmission line, and both or either the inner and outer conductors may be formed using fabrication system 220. A ferrite dielectric sleeve may be threaded or pressed between the inner and outer conductors. External magnetic fields may be applied as needed to magnetize the ferromagnetic material (e.g., in a particular direction relative to an expected propagation direction of an electromagnetic wave or other type of signal). The nonmagnetic conductor covering the ferromagnetic material prevents electromagnetic coupling of the magnetic field to the incident electromagnetic wave in nonmagnetic dielectrics. However, the ferrite dielectric sleeve (e.g., a magnetic dielectric) becomes polarized by the ferromagnetic material within the nonmagnetic conductor. This causes ferrite polarization of the electromagnetic field over the entire ferrite dielectric sleeve. The result is a reciprocal or nonreciprocal phase shift of the electromagnetic wave propagating down the transmission line, and similar structures can be used to form a number of different devices configured to modify how the electromagnetic wave propagates through the coaxial transmission line/waveguide.

Embodiments of the present disclosure provide a highly compact methodology to incorporate magnetic elements into electromagnetic filters, transmission lines, and couplers for increased radio frequency performance. The dimensions of the magnetic structures described herein can be patterned or formed from relatively large cm sizes down to approximately 10 um. The field strength of a hard ferromagnet used for macro-scale applications can be greater than 1 Tesla, but the field strength of a hard ferromagnet matrix patterned to 10 um in size can be between 0.2 and 0.5 Tesla. Soft ferromagnets demonstrate magnetic field strengths between 0.4 and 1.75 Tesla. The compact nature of the described fabrication processes allows embodiments to achieve nearly ideal magnetic coupling between magnetic structures integrated into a magnetic device, such as a coaxial transmission line, which helps compensate for any loss in field strength resulting from use of an additive manufacturing process or extrusion manufacturing process, as described herein.

Figure 3A:
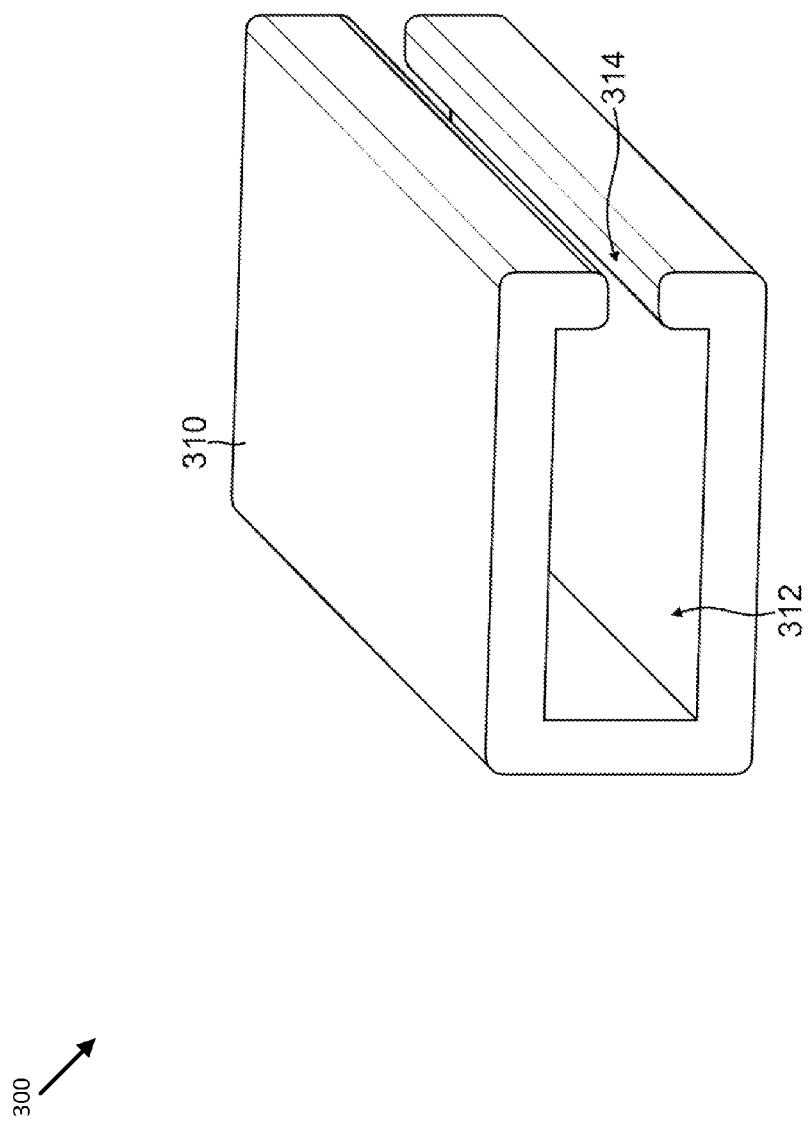
FIG. 3A illustrates a magnetic device and/or structure in the form of a C-shaped magnetic dielectric sleeve for use in a coaxial transmission line, in accordance with an embodiment of the disclosure.

FIG. 3A illustrates a magnetic device and/or structure 300 in the form of a C-shaped magnetic dielectric sleeve 310 for use in a coaxial transmission line, in accordance with an embodiment of the disclosure. As shown in FIG. 3A, magnetic dielectric sleeve 310, which may be formed from a ferrite matrix, includes center channel 312 configured to receive an inner conductor of a coaxial transmission line, and side channel 314. Side channel 314 may be sized and/or otherwise configured to ease insertion of magnetic dielectric sleeve 310 into an outer conductor or insertion of an inner conductor into magnetic dielectric sleeve 310. The wall of magnetic dielectric sleeve 310 may have a similar thickness throughout magnetic dielectric sleeve 310, for example, which may typically be approximately at least 10-30 um thick, for example, or approximately 90 um thick or thicker, depending on the available space (e.g., typically set by the power requirements of the transmission line and the thermal stability of the magnetic material matrix used to form magnetic dielectric sleeve 310).

Each of the internal four corners of magnetic dielectric sleeve 310 may be formed according to a relatively stringent radius requirement (e.g., an approximate 5 um radius), for example, and the external four corners and the edges of side channel 314 may be formed according to the same or a less stringent radius (e.g., an approximate 20 um radius). Typical gap sizes of side channel 314 can be approximately equal to the selected wall width of magnetic dielectric sleeve 310, for example, or between approximately 30-60 um, such as 50 um. The internal dimensions (width and height) of magnetic dielectric sleeve 310 may be sufficient to allow insertion of an inner conductor with a specified clearance, and the external dimensions of magnetic dielectric sleeve 310 may be sufficient to allow insertion into an outer conductor with a specified clearance. For example, the external dimensions of magnetic dielectric sleeve 310 may be approximately 0.5 mm wide and 0.25 mm high, and the internal dimensions may be approximately 0.4 mm wide and 0.15 mm high.

Figure 3B:
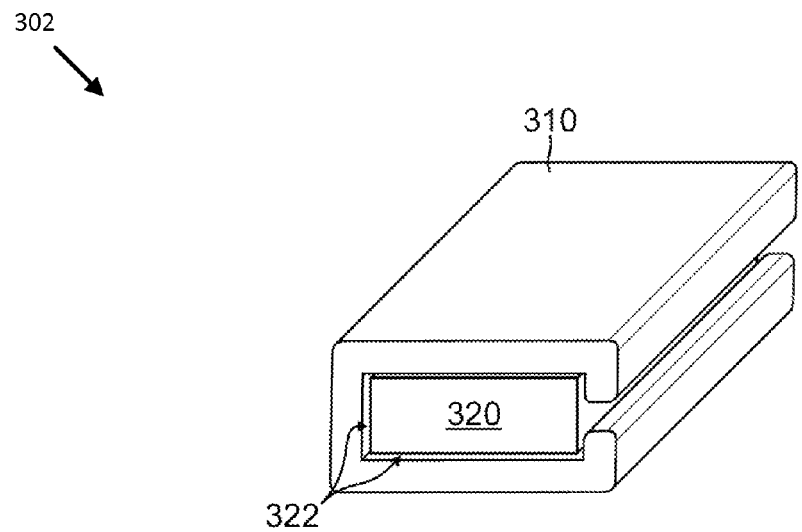
FIG. 3B illustrates the magnetic device and/or structure in FIG. 3A with an inner conductor for use in a coaxial transmission line, in accordance with an embodiment of the disclosure.
Figure 3C:
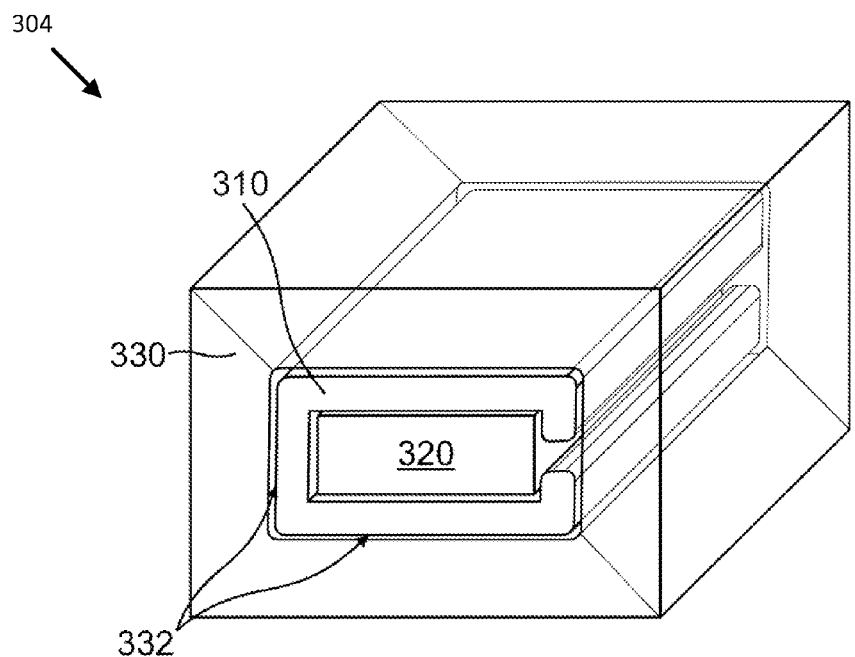
FIG. 3C illustrates the magnetic device and/or structure in FIG. 3A with an inner conductor and an outer conductor for use in a coaxial transmission line, in accordance with an embodiment of the disclosure.

FIG. 3B illustrates a magnetic structure 302 including magnetic dielectric sleeve 310 in FIG. 3A with an inner conductor 320 for use in a coaxial transmission line, and FIG. 3C illustrates a magnetic structure 304 including magnetic dielectric sleeve 310 with inner conductor 320 and an outer conductor 330 for use in a coaxial transmission line, in accordance with an embodiment of the disclosure. As shown in FIG. 3B, magnetic dielectric sleeve 310 may be configured to form an inner clearance 322 between magnetic dielectric sleeve 310 and inner conductor 320 to allow for a slot fit of magnetic dielectric sleeve 310 over various shapes of inner conductor 320 (e.g., such as a rectangular spring pin shape, as shown). In FIG. 3C, magnetic dielectric sleeve 310 may be configured to form an outer clearance 332 between magnetic dielectric sleeve 310 and outer conductor 330 to allow for a clearance fit of magnetic dielectric sleeve 310 within outer conductor 330.

Inner clearance 322 and outer clearance 332 may be individually increased or decreased to ease assembly and/or to adjust a transmission property of magnetic structure/transmission line 304. Typically, inner clearance 322 and/or outer clearance 332 may range from 5 um to 12.5 um or more without negatively impacting the ferrite-adjusted transmission properties of magnetic structure/transmission line 304 across a transmission band spanning between at least 25 and 40 GHz. For example, clearance dependence of the transmission and reflection characteristics (e.g., often referred to as S11 and S21 transmission components in the art) of magnetic structure/transmission line 304 may be approximately as follows: for an inner clearance 322 of 5 um, an outer clearance 332 of 10 um, and a gap size of side channel 314 of 30 um, S11 may be characterized as approximately 0 dB insertion loss and S21 may characterized as less than −29 dB reflection between 25 and 40 GHz; for an inner clearance 322 of 12.5 um, an outer clearance 332 of 12.5 um, and a gap size of side channel 314 of 60 um, S11 may be characterized as approximately 0 dB insertion loss and S21 may characterized as less than −45 dB reflection between 25 and 40 GHz. However, too much clearance can result in improper placement of inner conductor 320 relative to magnetic dielectric sleeve 310 and/or either relative to outer conductor 330, and general performance can decline as the ratio of air/gap to dielectric cross sectional area within outer conductor 330 increases. Generally, the total clearance (e.g., the sum of the gaps on both top/bottom or left/right sides) should be approximately 20-30 um between the inner/outer conductor dimensions and the sleeve dimensions.

Figure 4A:
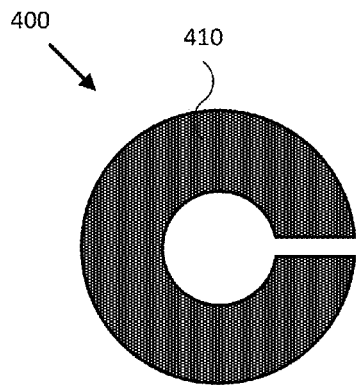
FIGS. 4A-D illustrate various magnetic devices and/or structures formed in accordance with embodiments of the disclosure.
Figure 4B:
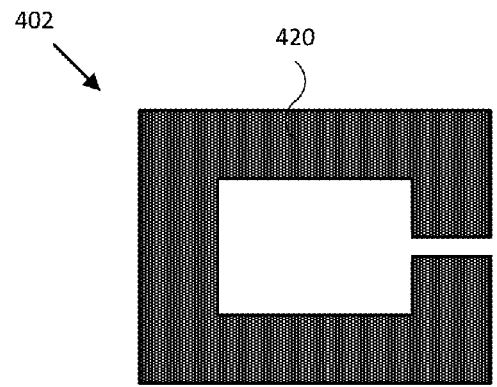

FIGS. 4A-D illustrate various magnetic devices and/or structures formed in accordance with embodiments of the disclosure. For example, magnetic structures 400 and 402 of respective FIGS. 4A and 4B illustrate reciprocal designs for magnetic dielectric sleeves. As shown, magnetic structure 400 is a cylindrical magnetic dielectric sleeve for use in a cylindrical coaxial transmission line, and magnetic structure 420 is a rectangular magnetic dielectric sleeve for use in a rectangular coaxial transmission line. In various embodiments, magnetic structure 410 may be formed entirely from ferrite matrix portion 410 and magnetic structure 420 may be formed entirely from ferrite matrix portion 420 using any of the systems and methods described herein, including additive manufacturing and extrusion manufacturing.

Figure 4C:
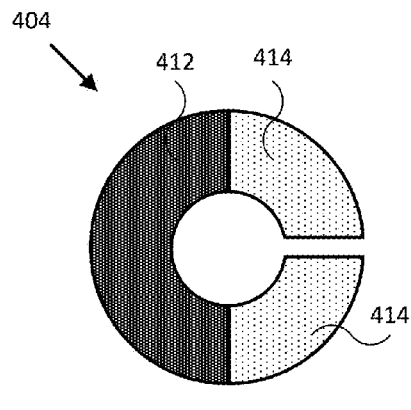
Figure 4D:
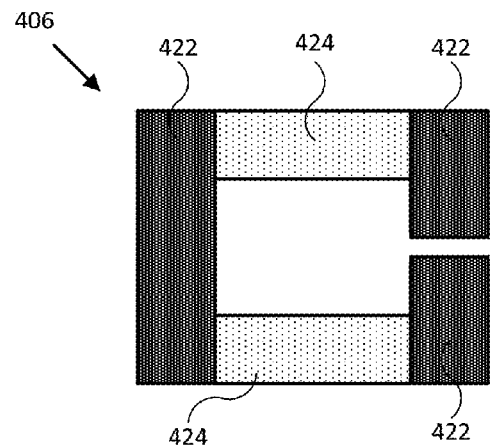

By contrast, magnetic structures 404 and 406 of respective FIGS. 4C and 4D illustrate nonreciprocal designs for magnetic dielectric sleeves. As shown, magnetic structure 404 is a cylindrical magnetic dielectric sleeve for use in a cylindrical coaxial transmission line and may include ferrite matrix portion 412 and nonmagnetic polymer portions 414. Magnetic structure 406 is a rectangular magnetic dielectric sleeve for use in a rectangular coaxial transmission line and may include ferrite matrix portions 422 and nonmagnetic polymer portions 424. Ferrite matrix portions 412 and 422 and nonmagnetic polymer portions 414 and 422 may be formed using any of the systems and methods described herein, including additive manufacturing and extrusion manufacturing. In general, such geometric asymmetry (e.g., relative to the longitudinal axis of the sleeve) is required for nonreciprocal designs for magnetic dielectric sleeves.

FIGS. 5A-G illustrate magnetic structures 500A-500G corresponding to various fabrication stages for a magnetic device and/or structure (e.g., the final form of which may correspond to magnetic structure 500G) in accordance with an embodiment of the disclosure. In particular, magnetic structures 500A-500K may correspond to a magnetic dielectric sleeve for use in assembling a transmission line for electromagnetic waves that is configured to modify propagation of the electromagnetic waves within the transmission line. For example, magnetic structures 500A-500G may correspond to or form part of a true delay line, a coupler, an isolator, a circulator, a reciprocal or nonreciprocal phase shifter, a nonreciprocal delay line, and/or other substantially passive electromagnetic wave propagation modification/adjustment device, in the form of a rectangular or square (e.g., where squares are a subset of the set of rectangles) coaxial transmission line (e.g., a micro-coax transmission line) and/or waveguide including one or more magnetic structures formed by an additive manufacturing process, as described herein, including an FFF MMAMS and/or a stereolithographic MMAMS. Fabrication sequences described herein may be monolithically integrated and can be batch fabricated with an expected completion time between a few minutes or hours to one or two days, which is a substantial decrease in overall fabrication time.

FIG. 5A illustrates a first fabrication stage of magnetic structure 500G. As shown in the embodiment provided by FIG. 5A, magnetic structure 500A includes a polymer layer 512 formed on a substantially flat substrate 510. For example, polymer layer 512 may be formed using MMAMS 110, and may be a single layer or multiple layers thick, depending on the dimension resolution of MMAMS 110. In general, neither substrate 510 not polymer layer 512 form part of the resulting magnetic structure 500G, and instead are used to provide physical support of various formation steps as described herein. As such, substrate 510 may be formed from a substantially nonmagnetic material that is structurally robust and substantially optically flat yet easily delaminated from polymer layer 512 either by physical force or by dissolving substrate 510 and/or polymer 512 to leave magnetic structure 500G. Moreover, polymer layer 512 may be formed from a dissolvable and substantially nonmagnetic polymer material (e.g., dissolvable in immersion system 228) that is configured to dissolve and leave magnetic structure 500G separated from substrate 510. Substrate 510 and polymer layer 512 may be any thickness sufficient to facilitate subsequent fabrication stages or processes, but polymer layer 512 may preferably be approximately the same thickness as a wall thickness of magnetic structure 500G.

In FIG. 5B, left and right polymer strips 520 and 522 may be formed on polymer layer 512 and a ferrite matrix 524 may be formed between left and right polymer strips 520 and 522 and on polymer layer 512 to form magnetic structure 500B. For example, left and right polymer strips 520 and 522 and ferrite matrix 524 may be formed using MMAMS 110, and each may be a single layer or multiple layers thick, depending on the dimension resolution of MMAMS 110. In some embodiments, MMAMS 110 may be implemented with an FFF AMS, for example, and ferrite matrix 524 may include ferrite (e.g., ferrimagnetic) powder impregnated filament polymer (e.g., Barium Hexaferrite powder impregnated filament ABS) prepared by preparation system 211, for example, and provided to supplier 115 of MMAMS 110. In other embodiments, MMAMS 110 may be implemented with a stereolithographic AMS, for example, and ferrite matrix 524 may include ferrite powder impregnated liquid polymer mixed together or otherwise prepared by preparation system 211, for example, and provided to supplier 115 of MMAMS 110. In embodiments where magnetic structure 500B is formed using a stereolithographic or liquid based AMS, left and right polymer strips 520 and 522 may be used as a mould for ferrite matrix 524, for example. In various embodiments, left and right polymer strips 520 and 522 and ferrite matrix 524 may be approximately the wall thickness of magnetic structure 500G, and ferrite matrix 524 may substantially fill the surface between left and right polymer strips 520 and 524. Further, ferrite matrix 524 may be substantially dielectric, based on the material selection of the ferrite powder and the polymer. A cured or otherwise solidified ferrite matrix 528 may also be referred to as a ferrite structure or ferrimagnet.

In FIG. 5C, left, middle, and right polymer strips 530, 532, and 534 may be formed on magnetic structure 500B and left and right ferrite matrixes 536 and 538 may be formed between left, middle, and right polymer strips 530, 532, and 534 and on magnetic structure 500B to form magnetic structure 500C, using similar processes and methods as those described with respect to FIG. 5B. Moreover, ferrite matrixes 536 and 538 may be formed on ferrite matrix 524 so as to fuse or otherwise form a connected monolithic magnetic structure.

Figure 5E:
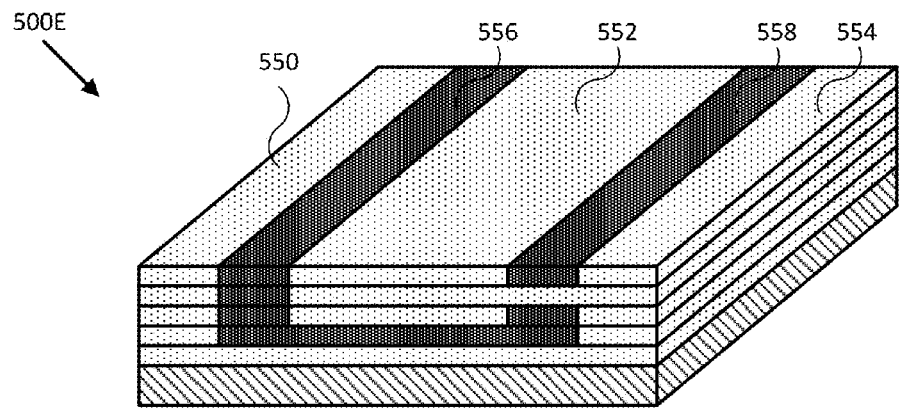
Figure 5F:
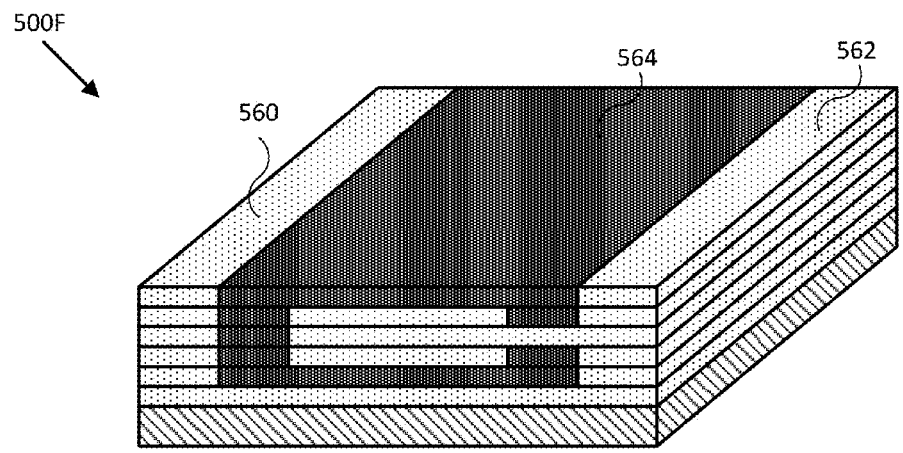

Similarly, in FIG. 5D, polymer strip 540 and polymer mesa 542 may be formed on magnetic structure 500C, and ferrite matrix 544 may be formed between polymer strip 540 and polymer mesa 542 and on magnetic structure 500C to form magnetic structure 500D. In FIG. 5E, similar to FIG. 5C, polymer strips 550, 552, and 554 may be formed on magnetic structure 500D, and ferrite matrixes 556 and 558 may be formed between polymer strips 550, 552, and 554 and on magnetic structure 500D to form magnetic structure 500E. In FIG. 5F, similar to FIG. 5B, left and right polymer strips 560 and 562 may be formed on magnetic structure 500E and a ferrite matrix 564 may be formed between left and right polymer strips 560 and 562 and on magnetic structure 500E to form magnetic structure 500F. In each fabrication step, overlapping ferrite matrixes are formed so as to fuse to one another and form a physically connected and monolithic magnetic structure.

Figure 5G:
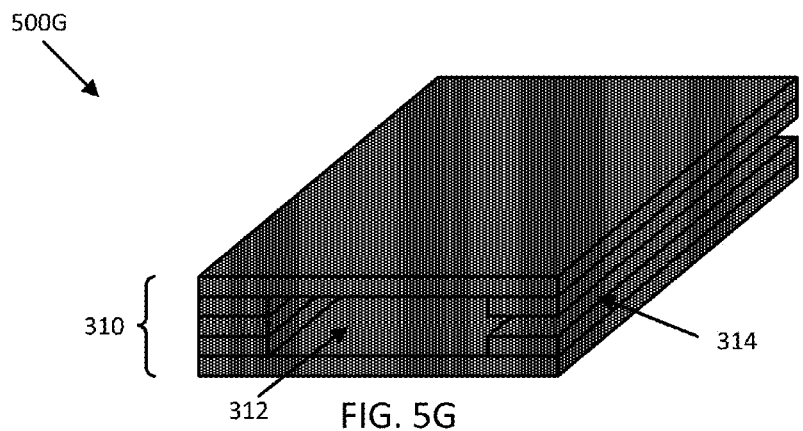

In FIG. 5G, substrate 510 is removed and the various nonmagnetic polymer layers, strips, and mesas are dissolved or stripped away from the ferrite matrix to form magnetic structure 500G, which, in the embodiment shown in FIG.

5G, represents C-shaped ferrite dielectric sleeve 310 including center channel 312 and side channel 314, as further described with respect to FIGS. 3A-C. For example, upon completing magnetic structure 500E, MMAMS 110 may be configured to provide magnetic structure 500E to immersion system 228 (e.g., using transport 222), which may be configured to dissolve away the various nonmagnetic polymer layers to produce magnetic structure 500G. Once magnetic structure 500G is formed, magnetic structure 500G may be used by fabrication system 220 to form various coaxial transmission lines and/or electronic devices that utilize coaxial transmission lines.

Figure 6B:
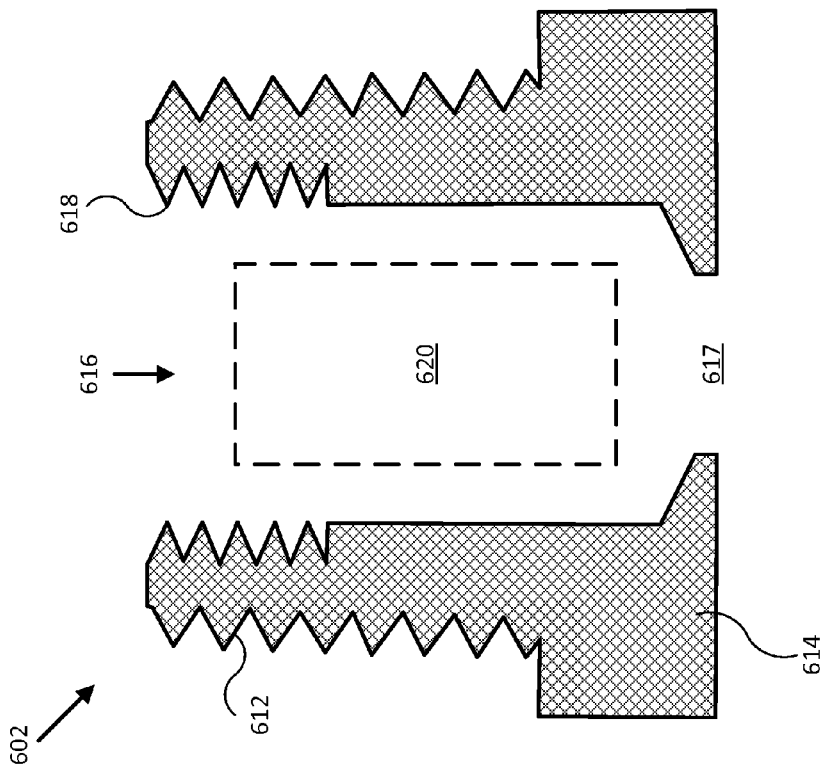
FIGS. 6A-C illustrate various portions of a pattern extrusion tool used to form a magnetic device and/or structure in accordance with an embodiment of the disclosure.
Figure 6A:
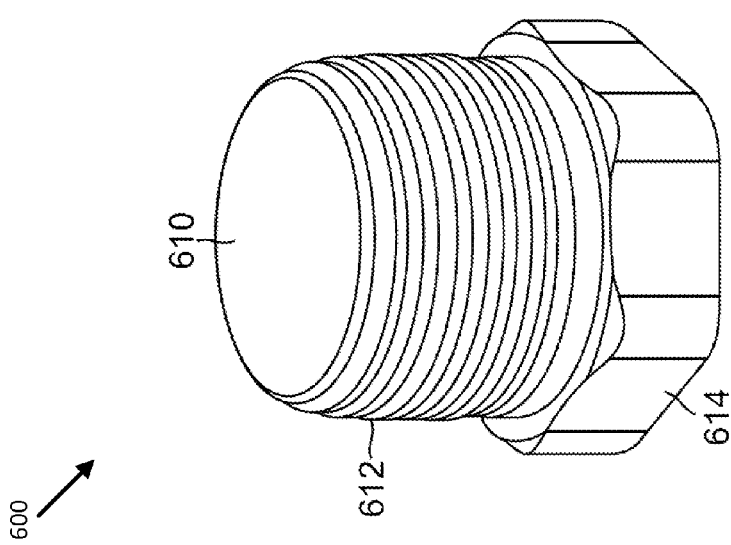
Figure 6C:
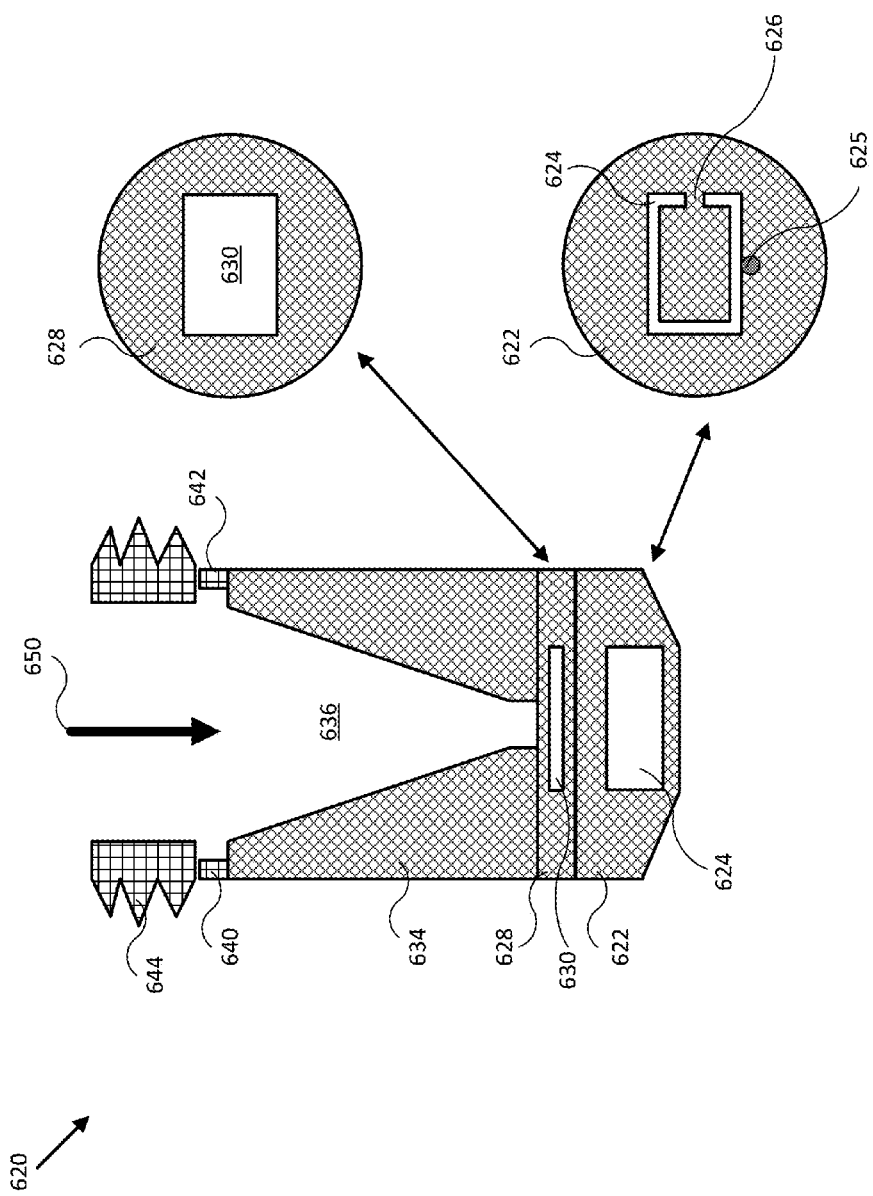

FIGS. 6A-C illustrate various portions of a pattern extrusion tool used to form a magnetic device and/or structure in accordance with an embodiment of the disclosure. In particular, FIG. 6A shows brass rod stock 600 in the form of a hex head brass nut including rod body 610, external threads 612, and bolt head 614, which may be configured to screw into a press or ram that forcefully provides bulk magnetic material matrix to a pattern extrusion tool. FIG. 6B shows pattern extrusion tool 602 formed from brass rod stock 600 after machining to form hollow body 616, orifice 617, and internal threads 618 configured to receive and secure disk assembly 620 within hollow body 616 to form pattern extrusion tool 602.

FIG. 6C illustrates a disk assembly 620 for pattern extrusion tool 602, in accordance with an embodiment of the disclosure. In the embodiment shown in FIG. 6C, disk assembly 620 is configured to receive pressurized solid or semisolid bulk magnetic material matrix (e.g., from preparation system 211, forced into disk assembly 620 along extrusion direction 650 by a press or ram of MMBES 232 coupled to pattern extrusion tool 602) and provide a patterned magnetic wire in the form of a C-shaped magnetic dielectric sleeve, which can be used to assemble a coaxial transmission line, as described herein. As shown, disk assembly 620 may include a sleeve pattern disk 622, a perimeter pattern disk 628, and a taper disk 634 secured within pattern extrusion tool 602 by retention nut 644 and pattern-aligned with each other using one or more alignment pins 640 and 642. In typical embodiments, each disk is formed from brass for thermal stability and strength, and alignment pins 640 and 642 and retention nut 644 are formed from steel for strength.

In general usage, solid or semisolid magnetic material matrix received by disk assembly 620 may be first forced through taper channel 636 of taper disk 634, which may be configured to reduce a cross section of the magnetic material matrix (e.g., in the form of a billet) to a rough diameter that is at least smaller than the extents of perimeter pattern 630 in perimeter pattern disk 628. This reduces a risk of damage to the remaining disks of disk assembly 620 and, in some embodiments, provides additional surface area and a higher ratio of surface area to cross sectional area that may be used to heat the magnetic material matrix to a specified and/or regulated temperature as it passes through taper disk 634. In various embodiments, the taper profile of taper disk 634 and taper channel 636 may be adjusted to accommodate a particular type of material viscosity or consistency. For example, with respect to a magnetic material matrix comprising ferrite impregnated ABS, the taper profile may be approximately 70 degrees over a length of approximately 0.5 inches, with an overall diameter of approximately 0.4 inches, an output orifice diameter of approximately 0.05 inches, and an output orifice length of approximately 0.03 inches.

After passing through taper disk 634, the reduced or compressed magnetic material matrix may be presented to perimeter pattern disk 628, which may be configured to allow the compressed magnetic material matrix to expand to the perimeter of the end pattern produced by pattern extrusion tool 602. For example, as shown in FIG. 6C, the perimeter of perimeter pattern 630 encompasses the outer perimeter of sleeve pattern 624 except for the bridge portion 626 (e.g., that is configured to form side channel 314 of C-shaped magnetic dielectric sleeve 310). In various embodiments, a diameter and/or thickness of perimeter pattern disk 628 may be adjusted to accommodate a diameter of hollow body 616, a particular type of material, or a particular pattern shape. For example, with respect to a magnetic material matrix comprising ferrite impregnated ABS and a sleeve pattern perimeter of approximately 0.5 mm in diameter, perimeter pattern disk 628 may be approximately 0.4 inches wide (and/or the same width as taper disk 634) and approximately 0.05 inches thick. In various embodiments, perimeter pattern disk 628 may be relatively thin because it is supported on both sides by relatively thick taper disk 634 and sleeve pattern 624.

After passing through perimeter pattern disk 628, perimeter patterned magnetic material matrix may be presented to sleeve pattern disk 622, which may be configured to pattern the perimeter patterned magnetic material matrix into a magnetic dielectric sleeve (e.g., C-shaped magnetic dielectric sleeve 310, or any of C-shaped magnetic dielectric sleeves 400, 402, 404, or 406, for example). In general, the dimensions of sleeve pattern 624 may be approximately the same as the dimensions of the desired sleeve. In various embodiments, a diameter and/or thickness of sleeve pattern disk 622 may be adjusted to accommodate a diameter of hollow body 616, a particular type of material, or a particular sleeve pattern shape. For example, with respect to a magnetic material matrix comprising ferrite impregnated ABS and a sleeve pattern perimeter of approximately 0.5 mm in diameter, sleeve pattern disk 622 may be approximately 0.4 inches wide (and/or the same width as perimeter pattern disk 628) and approximately 0.15 inches thick. Moreover, an end taper of sleeve pattern disk 622 may be formed to match an end taper of hollow body 616 so that machined rod stock 600 may provide structural support for sleeve pattern disk 622. In general, the taper profile (e.g., the angle of the taper within taper channel 636 of taper disk 634) and the area defined by perimeter pattern 630 provide the control parameters (e.g., flow, uniform distribution, flow capacitance, and/or other control parameters) configured to obtain uniform extrusion through sleeve pattern 624.

As shown in FIG. 6C, in some embodiments, sleeve pattern disk 622 may include filled starting hole 625. For example, sleeve pattern 624 may be formed by electrical discharge machining (EDM), which typically requires formation of a starting hole through sleeve pattern disk 622 before the remaining portions of sleeve pattern 624 can be machined away. The starting hole typically does not match the required dimensions of sleeve pattern 624, and so the starting hole is typically filled after the EDM is completed, thereby forming filled starting hole 625. Extrusions formed using sleeve pattern disk 622 including filled starting hole 625 often include an extrusion defect called a sprew, which is a defect in the shape of the extruded magnetic wire. In some embodiments, fabrication system 220 and/or MMBES 232 may include and/or be integrated with a sprew removal device (e.g., other devices 230) that is configured to remove the sprew before inserting the resulting magnetic dielectric sleeve into an outer conductor, shown in more detail with respect to FIGS. 7A-D.

In addition, although disk assembly 620 is described with respect to forming a shaped magnetic wire out of magnetic material matrix, disk assembly 620 may be modified to receive multiple types of magnetic material matrixes (e.g., different base polymers or different magnetic materials and/or types of magnetic materials) and/or one or more types of substantially nonmagnetic materials (e.g., one or more different types of substantially nonmagnetic polymers). For example, taper disk 634 may be implemented with multiple taper channels each configured to receive a selected magnetic matrix material and/or nonmagnetic material and deliver the selected materials to specific portions of perimeter pattern disk 628 and/or sleeve pattern disk 622. In some embodiments, additional pattern disks and/or channel disks may be inserted between taper disk 634, perimeter pattern disk 630, and/or sleeve pattern disk 622, to funnel selected materials to portions of perimeter pattern disk 628 and/or sleeve pattern disk 622.

For example, in one embodiment, taper disk 634 may be implemented with four taper channels 636, two channels configured to receive ferrite matrix, and two channels to receive plain ABS. The two ferrite matrix channels may be configured to provide ferrite matrix to left and right portions of perimeter pattern disk 630 and/or sleeve pattern disk 622, and the two ABS channels may be configured to provide ABS to top and bottom portions of perimeter pattern disk 630 and/or sleeve pattern disk 622, and the resulting magnetic dielectric sleeve may be substantially the same as magnetic dielectric sleeve 406 illustrated in FIG. 4D. The shape of the taper channels and the various patterns, the materials used, and, in some embodiments, an applied heat (e.g., where compression in the extrusion process is not sufficient by itself), may be selected or configured to cause the different materials to fuse to each other as they are extruded from sleeve pattern disk 622 to form a monolithic magnetic dielectric sleeve 406.

Although pattern extrusion tool 602 and/or disk assembly 620 have been described in relation to formation of a magnetic dielectric sleeve, it should be understood that pattern extrusion tool 602 and/or disk assembly 620 may be configured to produce shaped magnetic wires configured for other purposes, such as shaped magnetic wires with different extrudable shapes and/or formed from different typed of magnetic materials, such as ferromagnetic materials, conductive materials, and/or combinations of ferrimagnetic, ferromagnetic, nonmagnetic, ferrite, conductive, nonconductive, and/or other materials. Furthermore, although described general as disks, taper disk 634, perimeter pattern disk 630, and sleeve pattern disk 622 may be formed from rectangular or otherwise shaped plates.

Figure 7A:
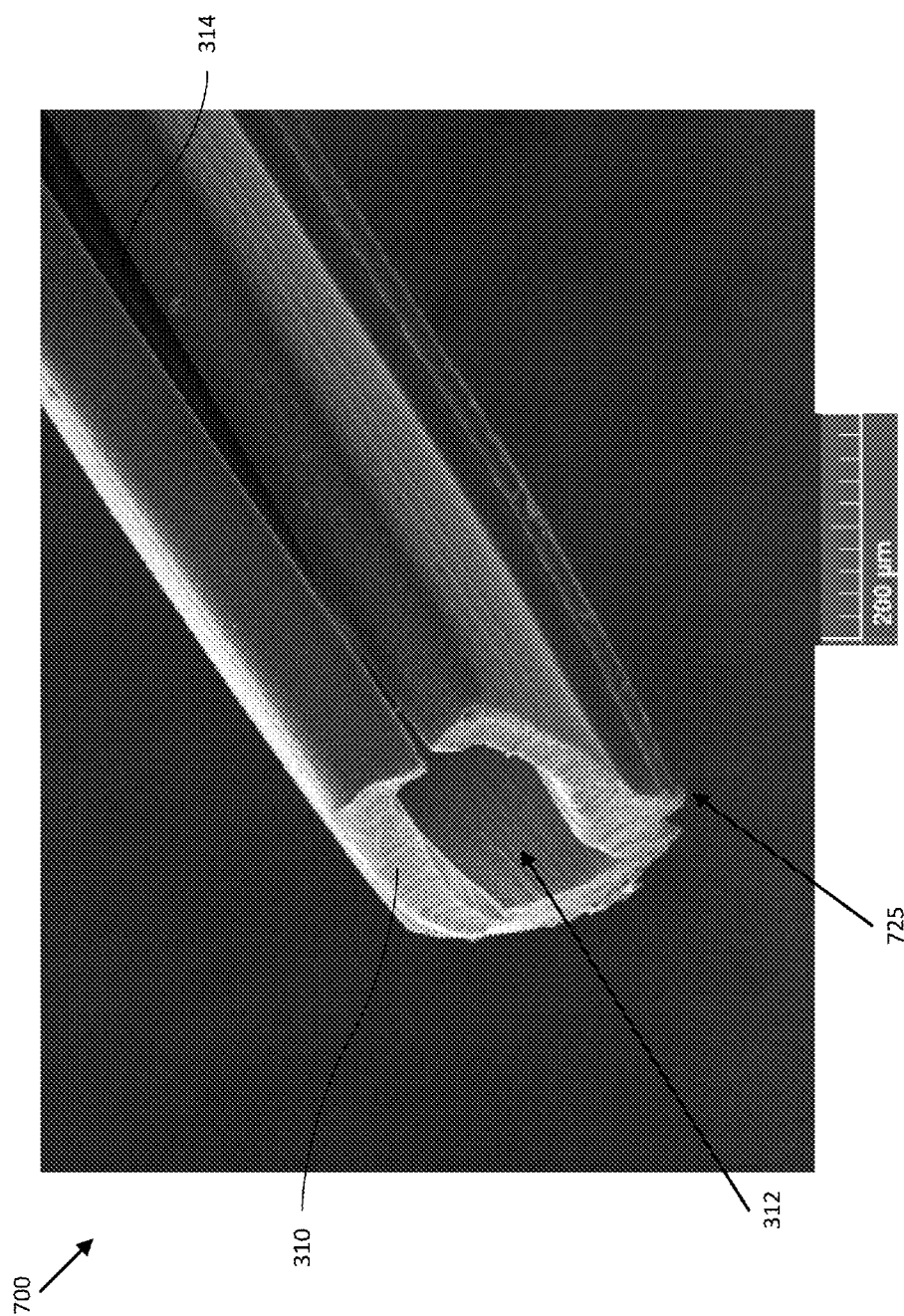
FIG. 7A illustrates a magnetic device and/or structure in the form of a C-shaped magnetic dielectric sleeve for use in a coaxial transmission line, in accordance with an embodiment of the disclosure.
Figure 7B:
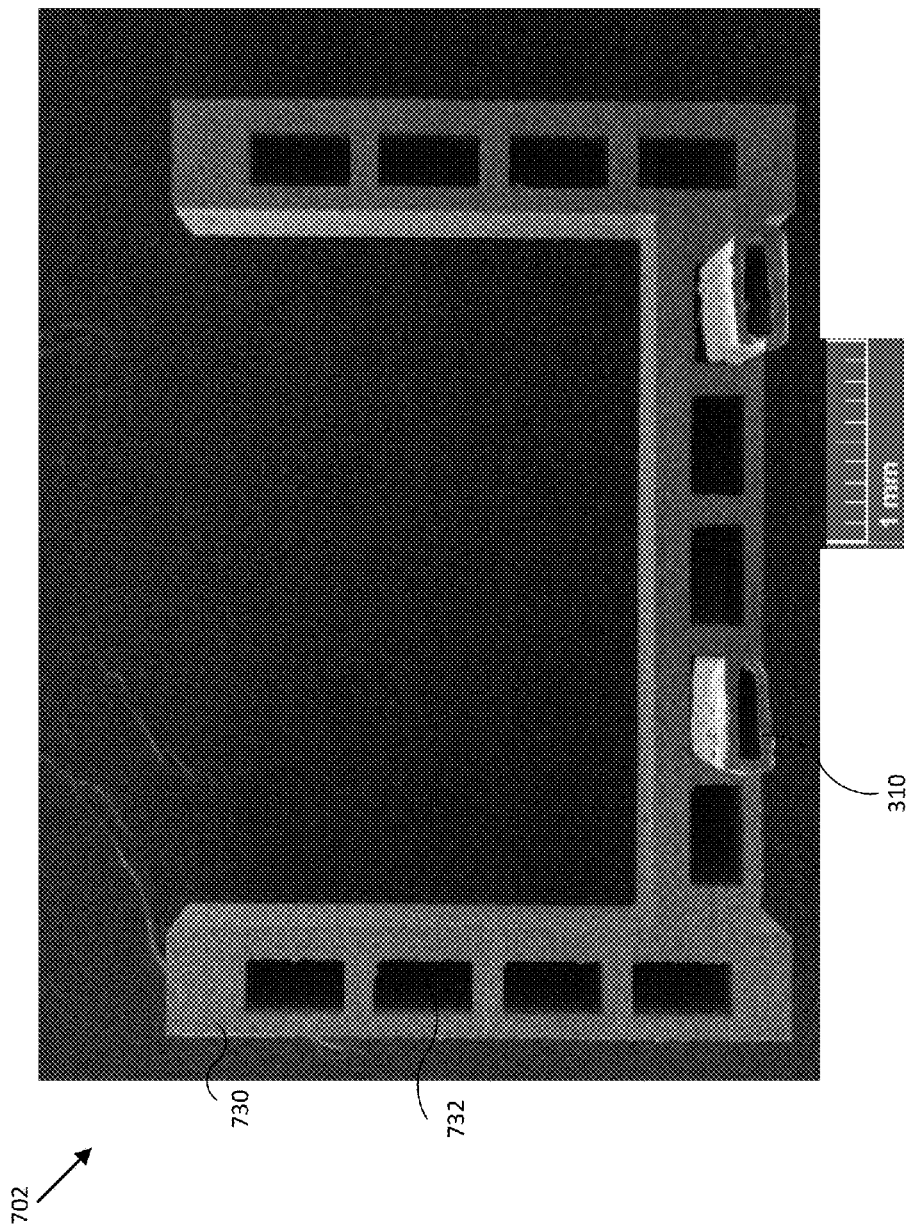
FIG. 7B illustrates a magnetic device and/or structure with an outer conductor for use in a coaxial transmission line, in accordance with an embodiment of the disclosure.

FIG. 7A illustrates a magnetic device and/or structure 700 in the form of a C-shaped magnetic dielectric sleeve 310 for use in a coaxial transmission line, in accordance with an embodiment of the disclosure. As shown in FIG. 7A, magnetic dielectric sleeve 310, which may be formed using pattern extrusion tool 602 and disk assembly 620, includes center channel 312, side channel 314, and sprew 725. FIG. 7B illustrates a magnetic device and/or structure 702 in the form of magnetic dielectric sleeve 310 inserted into an outer conductor 730 for use in a coaxial transmission line, in accordance with an embodiment of the disclosure. In the embodiment shown in FIG. 7B, outer conductor 730 includes multiple channels 732 each configured to accept a magnetic dielectric sleeve 310 in order to assemble multiple coaxial transmission lines using a common outer conductor.

Figure 7C:
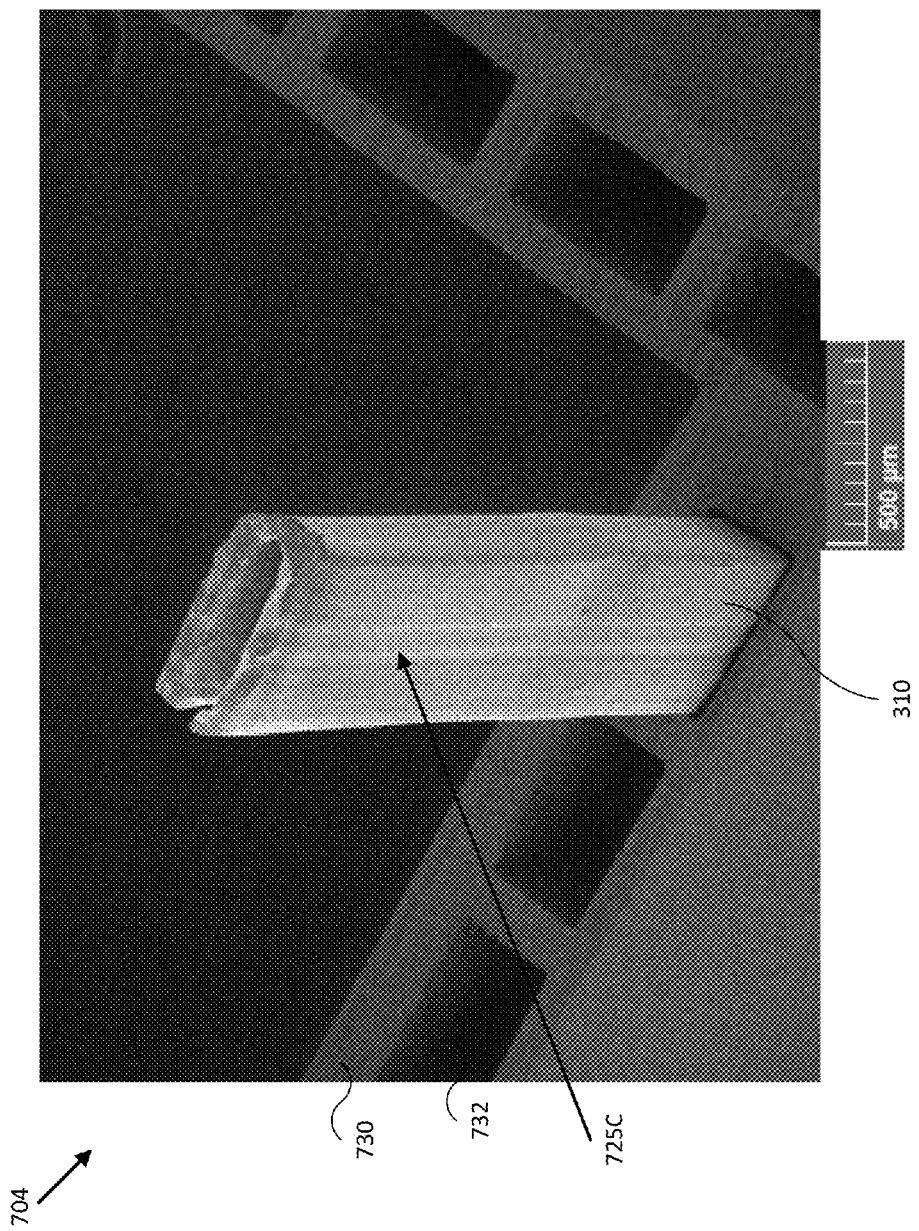
FIG. 7C illustrates a magnetic device and/or structure with an outer conductor for use in a coaxial transmission line, in accordance with an embodiment of the disclosure.

FIG. 7C illustrates a magnetic device and/or structure 704 in the form of magnetic dielectric sleeve 310 inserted into an outer conductor 730 for use in a coaxial transmission line, in accordance with an embodiment of the disclosure. In the embodiment shown in FIG. 7C, outer conductor 730 includes multiple channels 732 each configured to accept a magnetic dielectric sleeve 310 in order to assemble multiple coaxial transmission lines using a common outer conductor. Furthermore, sprew 725 has been removed from magnetic dielectric sleeve 310, leaving finished surface 725C, thereby allowing magnetic dielectric sleeve 310 to be threaded and/or pressed into outer conductor 730 more easily.

Figure 7D:
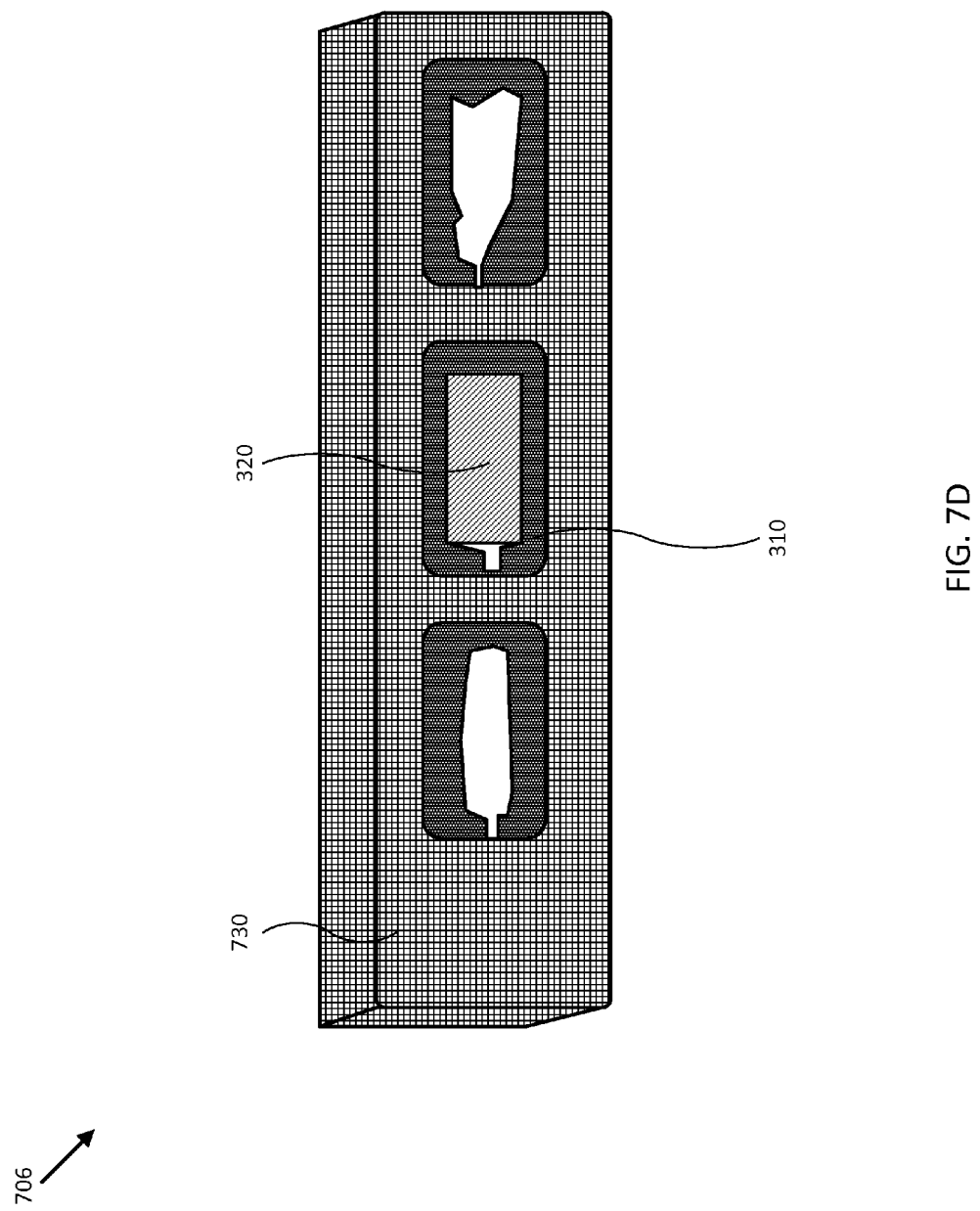
FIG. 7D illustrates a magnetic device and/or structure with an inner conductor and an outer conductor for use in a coaxial transmission line, in accordance with an embodiment of the disclosure.

FIG. 7D illustrates a magnetic device and/or structure 706 in the form of magnetic dielectric sleeve 310 inserted into an outer conductor 730 and inner conductor 320 (e.g., in the form of a rectangular spring pin) inserted into magnetic dielectric sleeve 310 for use in a coaxial transmission line, in accordance with an embodiment of the disclosure. In the embodiment shown in FIG. 7D, outer conductor 730 includes multiple channels 732 each with a magnetic dielectric sleeve 310, thereby providing multiple coaxial transmission lines using a common outer conductor.

Figure 8:
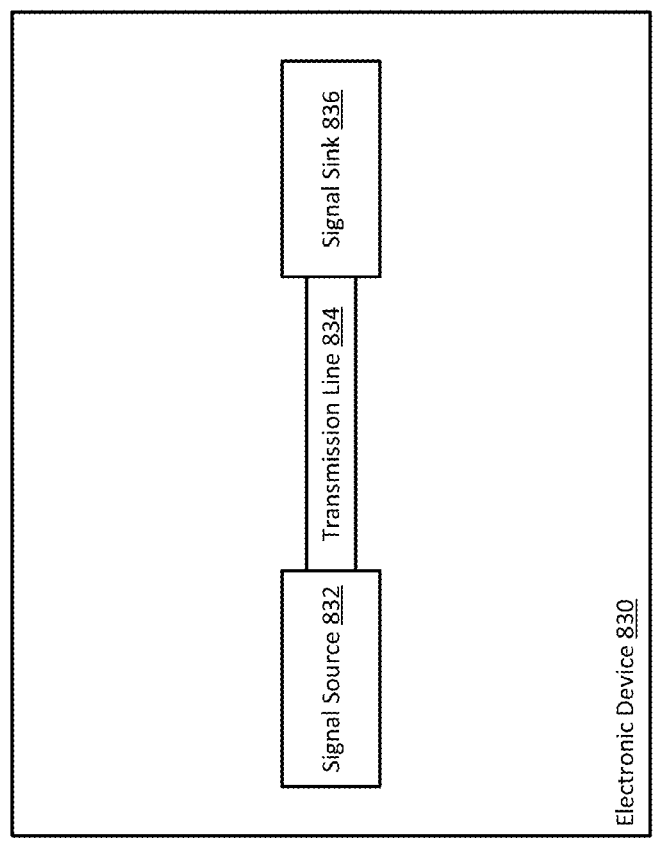
FIG. 8 illustrates a magnetic device and/or structure implemented in an electronic device in accordance with an embodiment of the disclosure.

FIG. 8 illustrates a magnetic device and/or structure implemented in an electronic device in accordance with an embodiment of the disclosure. For example, electronic device 830 may include a signal amplifier, a filter, a receiver, a transmitter, a transceiver, and/or other circuitry configured to provide an electronic function for electronic device 830, which may be implemented as a radar system, a communications system, a processing system, various other ranging sensor systems, and/or other electronic devices. In the embodiment shown in FIG. 8, electronic device 530 includes a signal source 832, a transmission line 834, and a signal sink 836. For example, signal source 832 may be a transmitter, transmission line 834 may be a magnetic device configured to couple signal source 832 to signal sink 836 and/or to provide a desired phase shift and/or delay for an electromagnetic wave travelling through transmission line 834, and signal sink 836 may be an antenna (e.g., a patch antenna array) or an optical aperture. In general, signal source 832 may be any electronic device configured to generate or provide an electromagnetic signal, transmission line 834 may be any embodiment of the present disclosure including a magnetic structure and/or device configured to modify electromagnetic waves/signals as they propagate through transmission line 834, and signal sink 836 may be any electronic device and/or element configured to receive an electromagnetic wave from signal source 832 and/or transmission line 834. Embodiments of electronic device 830 may be configured (e.g., scaled) to operate over a frequency range and/or according to various applications from 100-400 MHz up to approximately 60 GHz or higher, for example.

Figure 9:
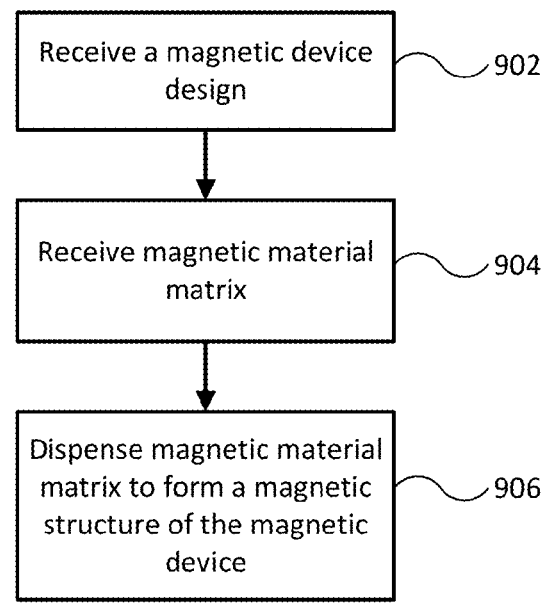
FIG. 9 illustrates a flow diagram of various operations to form a magnetic device and/or structure using a magnetic materials additive manufacturing system and/or a magnetic materials bulk extrusion system in accordance with an embodiment of the disclosure.

FIG. 9 illustrates a flow diagram 900 of various operations to form a magnetic device using an MMAMS and/or an MMBES in accordance with an embodiment of the disclosure. In some embodiments, the operations of FIG. 9 may be implemented as software instructions executed by one or more logic devices associated with corresponding elements of FIGS. 1-2. More generally, the operations of FIG. 9 may be implemented with any combination of software instructions and/or electronic hardware (e.g., inductors, capacitors, amplifiers, or other analog and/or digital components). Any step, sub-step, sub-process, or block of process 900 may be performed in an order or arrangement different from the embodiments illustrated by FIG. 9. For example, in other embodiments, one or more blocks may be omitted from the various processes, and blocks from one process may be included in another process. Furthermore, block inputs, block outputs, and/or other operational parameters may be stored prior to moving to a following portion of a corresponding process. Although process 900 is described with reference to elements of FIGS. 1-8, process 900 may be performed by other elements and including a different selection of user modules, system fabrics, and/or subsystems.

In block 902, an MMAMS and/or an MMBES receives a magnetic device design. For example, controller 112 of MMAMS 110 and/or MMBES 232 may be configured to receive a data file comprising a magnetic device design corresponding to magnetic device/transmission line 304 or 702 and/or magnetic dielectric sleeve 310. In some embodiments, a magnetic device design may be stored on a memory device that is coupled to controller 112 over an interface. Once received, controller 112 may be configured to convert or interpret the magnetic device design to control various elements of MMAMS 110 and/or MMBES 232 to construct or form magnetic device 304/702 and/or magnetic dielectric sleeve 310. In other embodiments, controller 212 may be configured to receive the data file and to coordinate with controller 112 and/or other elements of fabrication system 220 to control various elements of fabrication system 220 to construct or form magnetic device 304/702 and/or magnetic dielectric sleeve 310, 400, 402, 404, or 406, for example.

In block 904, an MMAMS and/or an MMBES receives magnetic material matrix. For example, depending on the type(s) of AMS integrated into MMAMS 110, MMAMS 110 may be configured to receive magnetic matrix liquid and/or magnetic matrix filament from preparation system 211 at supplier 115. Similarly, MMBES 232 may be configured to receive a liquid, semisolid, or solid bulk magnetic matrix from preparation system 211. In general, MMAMS 110 and/or MMBES 232 may be configured to receive any type of magnetic material matrix with which they are able and/or configured to form magnetic structures. Prior to receiving the magnetic material matrix, preparation system 211 may be configured to mix ferrite or ferromagnetic powder with a liquid polymer resin to form bulk liquid magnetic matrix, for example, and either provide the bulk liquid magnetic matrix to supplier 115 or first cure or solidify the bulk liquid magnetic matrix to form bulk solid or semisolid magnetic matrix, which may be provided directly to MMBES 232, or extrude magnetic matrix filament from the bulk solid magnetic matrix, and then provide the magnetic matrix filament (e.g., on a reel or spool) to supplier 115 for use with MMAMS 110.

In block 906, an MMAMS and/or an MMBES dispenses magnetic material matrix received in block 904 to form a magnetic structure of the magnetic device described in the magnetic device design received in block 902. For example, controller 112 of MMAMS 110 may be configured to control dispenser 114 to dispense liquid or filament or other type of magnetic material matrix to form ferrite matrix/structure 564 of magnetic device 500F. Similarly, controller 212 or a controller of MMBES 232 may be configured to control pattern extrusion tool 234 or 602 to dispense bulk magnetic material matrix by extruding magnetic structure 310 from the bulk magnetic matrix received in block 904. In embodiments where a magnetic structure includes a ferrite matrix, the ferrite matrix may be configured to receive a poling field from a ferromagnet By providing such magnetic structures and/or devices in the context of additive manufacturing processing and/or extrusion manufacturing, embodiments of the present disclosure enable formation of magnetic devices relatively quickly, compactly, and inexpensively. Moreover, such devices exhibit excellent performance relative to conventional phase shift technology, for example, can reduce size, insertion loss, and weight to approximately 0.1 cubic inch, 0.05 dB, and less than 100 grams for each device, and can operate reliably when conveying more than 1 Watt of transmitted power (e.g., for phased radar array applications). Conventional systems are typically an order of magnitude worse across the range of performance metrics, at much higher overall cost.

Figure 10:
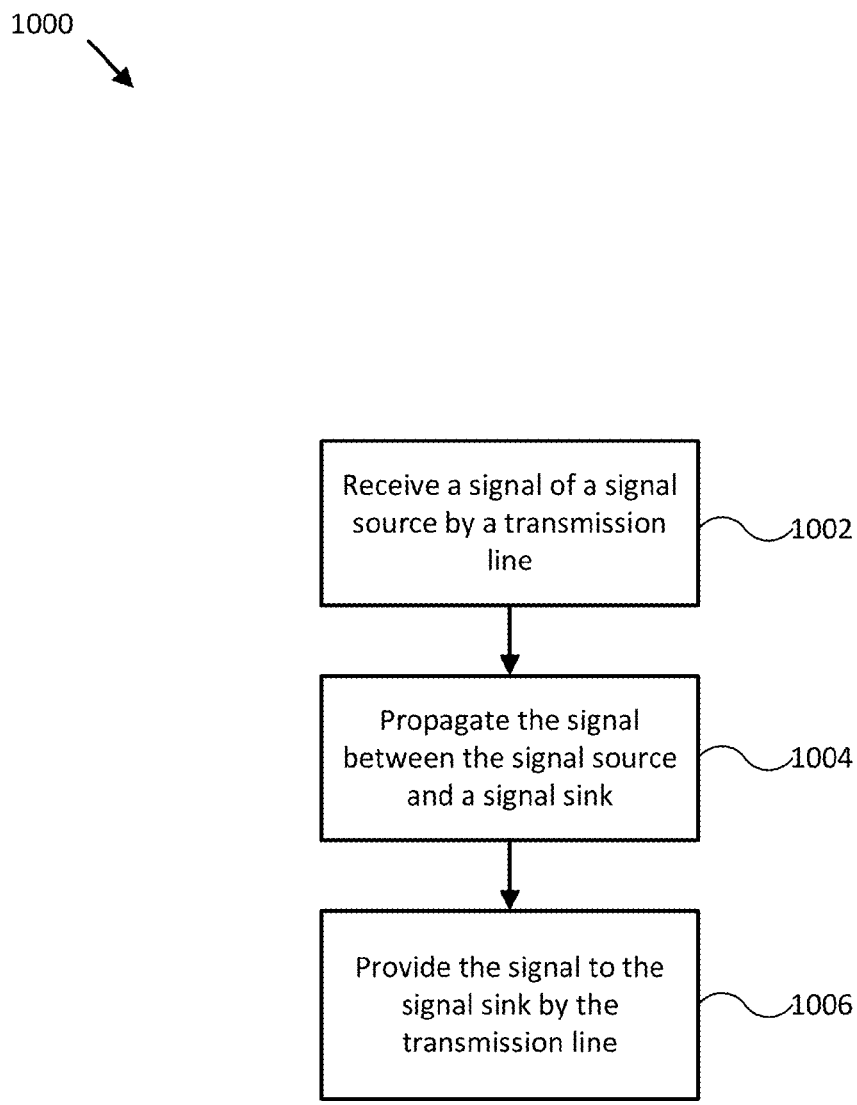
FIG. 10 illustrates a flow diagram of various operations to use a magnetic device and/or structure in accordance with an embodiment of the disclosure.

FIG. 10 illustrates a flow diagram 1000 of various operations to use a magnetic device and/or structure in accordance with an embodiment of the disclosure. In some embodiments, the operations of FIG. 10 may be implemented as software instructions executed by one or more logic devices associated with corresponding elements of FIGS. 1-2. More generally, the operations of FIG. 10 may be implemented with any combination of software instructions and/or electronic hardware (e.g., inductors, capacitors, amplifiers, or other analog and/or digital components). Any step, sub-step, sub-process, or block of process 1000 may be performed in an order or arrangement different from the embodiments illustrated by FIG. 10. For example, in other embodiments, one or more blocks may be omitted from the various processes, and blocks from one process may be included in another process. Furthermore, block inputs, block outputs, and/or other operational parameters may be stored prior to moving to a following portion of a corresponding process. Although process 1000 is described with reference to elements of FIGS. 1-8, process 1000 may be performed by other elements and including a different selection of user modules, system fabrics, and/or subsystems.

In block 1002, a signal of signal source is received by a transmission line. For example, transmission line 834 of electronic device 830 may be configured to receive a signal (e.g., an electrical signal, an optical signal, and/or any other type of propagating electromagnetic wave, for example) from signal source 832. In various embodiments, transmission line 834 may be implemented according to magnetic device 304, 400, 402, 404, 406, 500G, and/or any of magnetic devices 700-706, using an embodiment of MMAMS 110, MMBES 232, and/or fabrication system 220, as described herein.

In block 1004, the signal received in block 1002 is propagated between a signal source and a signal sink. For example, transmission line 834 may be configured to propagate a signal received from signal source 832 between signal source 832 and signal sink 836. As described herein, magnetic structures within transmission line 834 may be configured/formed to modify a propagation characteristic of an electromagnetic wave associated with the propagated signal. For example, transmission line 834 may be configured to apply a phase shift, a true delay, a filter characteristic, and/or other reciprocal or nonreciprocal propagation characteristic modifications to the signal as it propagates through transmission line 834.

In block 1006, the signal propagated in block 1004 is provided by a transmission line to a signal sink. For example, transmission line 834 may be configured to provide a signal propagated by transmission line 834 between signal source 832 and signal sink 836 to signal sink 836. By implementing signal transmission using embodiments of the magnetic structures and/or devices formed using the magnetic materials additive manufacturing systems described herein, embodiments of the present disclosure provide inexpensive, compact, and robust electronic devices, which can be integrated into a variety of systems, such as navigational sensors and/or other systems used in operation of an aircraft.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method (900), comprising:
    receiving (902) a magnetic device design comprising a magnetic structure (310, 400, 402, 404, 406, 500G) to be formed, at least in part, from a magnetic material matrix (117, 410, 420, 412, 422, 524, 564), wherein the magnetic material matrix is configured to be used in at least one of a magnetic materials additive manufacturing system "MMAMS" (110) and a magnetic materials bulk extrusion system "MMBES" (232);
    receiving (904) the magnetic material matrix by at least one of the MMAMS and the MMBES; and
    dispensing (906) the magnetic material matrix using at least one of the MMAMS and the MMBES to form the magnetic structure, wherein the magnetic structure is configured to modify an electromagnetic propagation characteristic of a signal while it propagates through a magnetic device corresponding to the magnetic device design.

2. The method of claim 1, wherein:
    the MMAMS is at least partially implemented by a fused filament fabrication additive manufacturing system;
    the magnetic material matrix comprises a magnetic matrix filament; and
    the dispensing the magnetic material matrix comprises using an actuated filament extrusion nozzle to dispense the magnetic matrix filament in one or more patterned layers to form the magnetic structure.

3. The method of claim 1, wherein:
    the MMAMS is at least partially implemented by a stereolitho graphic additive manufacturing system;
    the magnetic material matrix comprises a liquid magnetic matrix; and
    the dispensing the magnetic material matrix comprises using an actuated liquid dispenser nozzle to dispense the magnetic matrix liquid in one or more patterned layers to form the magnetic structure.

4. The method of claim 1, wherein:
    the magnetic material matrix comprises a bulk magnetic matrix;
    the MMBES comprises a pattern extrusion tool configured to form a shaped magnetic wire from the bulk magnetic matrix;
    the dispensing the magnetic material matrix comprises using the pattern extrusion tool to extrude the magnetic structure from the bulk magnetic matrix.

5. The method of claim 1, wherein:
    the magnetic material matrix comprises a ferrite matrix (410, 420, 412, 422, 524, 564); and
    the magnetic structure comprises a magnetic dielectric sleeve configured to be inserted into an outer conductor (330, 730) and to receive an inner conductor (320) to form a coaxial transmission line (304, 706, 834).

6. The method of claim 5, wherein:
    the magnetic structure comprises a plurality of C-shaped magnetic dielectric sleeves;
    the outer conductor comprises a corresponding plurality of channels and is configured to form a common outer conductor for a corresponding plurality of transmission lines; and
    the method further comprises inserting each C-shaped magnetic dielectric sleeve into one of the plurality of channels of the outer conductor.

7. The method of claim 1, wherein:
    the magnetic material matrix comprises a ferrite matrix (410, 420, 412, 422, 524, 564) and the magnetic device comprises a transmission line (304, 706, 834);
    the transmission line comprises a inner conductor (320) separated from an outer conductor (330, 730) by at least a dielectric sleeve (310, 400, 402, 404, 406, 500G); and
    the dielectric sleeve comprises the ferrite matrix dispensed by at least one of the MMAMS and the MMBES.

8. The method of claim 7, wherein:
    the transmission line is configured to form a nonreciprocal electronic device.

9. The method of claim 7, wherein:
    the dielectric sleeve comprises a nonmagnetic material dispensed by at least one of the MMAMS and the MMBES; and
    the transmission line is configured to form a nonreciprocal electronic device.

10. The method of claim 1, further comprising preparing the magnetic material matrix by:
    mixing ferrite powder with a liquid polymer resin to form bulk liquid magnetic matrix; and
    providing the bulk liquid magnetic matrix to the MMAMS as the magnetic material matrix.

11. The method of claim 1, further comprising preparing the magnetic material matrix by:
    mixing ferrite powder with a liquid polymer resin to form bulk liquid magnetic matrix;
    curing or solidifying the bulk liquid magnetic matrix to form bulk solid magnetic matrix;
    extruding magnetic matrix filament from the bulk solid magnetic matrix; and
    providing the magnetic matrix filament to the MMAMS as the magnetic material matrix.

12. The method of claim 1, further comprising preparing the magnetic material matrix by:
    mixing ferrite powder with a liquid polymer resin to form bulk liquid magnetic matrix;

curing or solidifying the bulk liquid magnetic matrix to form bulk solid or semisolid magnetic matrix; and providing the bulk solid or semisolid magnetic matrix to the MMBES as the magnetic material matrix.

13. A system comprising a transmission line (304, 706, 834) formed using the method of claim 1, wherein:

the magnetic device corresponding to the received magnetic device design comprises the transmission line;

the transmission line comprises an inner conductor (320) separated from an outer conductor (330, 730) by at least a dielectric sleeve (310, 400, 402, 404, 406, 500G);

the dielectric sleeve comprises the magnetic structure of the received magnetic device design and is formed by the magnetic material matrix;

received and dispensed by the at least one of the MMAMS and the MMBES;

the magnetic material matrix comprises a ferrite matrix (410, 412, 420, 422, 524, 564); and the dielectric sleeve is configured to modify the electromagnetic propagation characteristic of an electromagnetic wave of the signal while it propagates through the transmission line.

14. The system of claim 13, wherein:

the dielectric sleeve is configured to modify at least one of a phase shift and a delay associated with the electromagnetic wave.

15. The system of claim 13, wherein:

the transmission line comprises a rectangular or a cylindrical coaxial transmission line; and the transmission line is configured to form a reciprocal or nonreciprocal electronic device.

16. The system of claim 13, wherein:

the outer conductor comprises a plurality of channels and is configured to form a common outer conductor for a corresponding plurality of transmission lines.

17. The method of claim 1, wherein the magnetic device comprises a transmission line (534), the method further comprising:

receiving (1002) the signal from a signal source (532) by the transmission line;

propagating (1004) the signal between the signal source and a signal sink (536); and providing (1006) the signal to the signal sink by the transmission line, wherein:

the transmission line comprises an inner conductor (320) separated from an outer conductor (330, 730) by at least a dielectric sleeve (310, 400, 402, 404, 406, 500G);

the magnetic material matrix comprises a ferrite matrix (410, 420, 412, 422, 524, 564);

the dielectric sleeve comprises the ferrite matrix dispensed by at least one of the MMAMS and the MMBES; and the ferrite matrix is configured to modify the electromagnetic propagation characteristic of the signal while it propagates between the signal source and the signal sink.

18. The method of claim 17, wherein:

the ferrite matrix is configured to modify at least one of a phase shift and a delay associated with the signal.

19. The method of claim 17, wherein:

the transmission line comprises a rectangular or a cylindrical coaxial transmission line; and the transmission line is configured to form a reciprocal or nonreciprocal electronic device.

20. The method of claim 17, wherein:

the outer conductor comprises a plurality of channels and is configured to form a common outer conductor for a corresponding plurality of transmission lines.

* * * * *

UNITED STATES PATENT AND TRADEMARK OFFICE
CERTIFICATE OF CORRECTION

PATENT NO. : 10,005,217 B2
APPLICATION NO. : 14/831815
DATED : June 26, 2018
INVENTOR(S) : John D. Williams and Andrew George Laquer Page 1 of 1

It is certified that error appears in the above-identified patent and that said Letters Patent is hereby corrected as shown below:

In the Claims

In Claim 3, Column 23, Line 63, change "stereolitho graphic" to --stereolithographic--.

Signed and Sealed this
Twenty-eighth Day of August, 2018

Andrei Iancu
*Director of the United States Patent and Trademark Office*